United States Patent
Tanaka

(10) Patent No.: US 8,390,827 B2
(45) Date of Patent: Mar. 5, 2013

(54) DRAWING PROCESSING APPARATUS, IMAGE OUTPUTTING APPARATUS, METHOD FOR DRAWING PROCESSING AND COMPUTER READABLE MEDIUM

(75) Inventor: Noriaki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 807 days.

(21) Appl. No.: 12/553,524

(22) Filed: Sep. 3, 2009

(65) Prior Publication Data

US 2010/0238473 A1    Sep. 23, 2010

(30) Foreign Application Priority Data

Mar. 19, 2009  (JP) ................................. 2009-067501

(51) Int. Cl.
*G06K 15/02* (2006.01)
*G06K 15/00* (2006.01)
(52) U.S. Cl. ...................... 358/1.11; 358/1.16
(58) Field of Classification Search .................. None
See application file for complete search history.

(56) References Cited

U.S. PATENT DOCUMENTS 5,617,525 A * 4/1997 Sugaya ................... 715/210

FOREIGN PATENT DOCUMENTS

| JP | A-07-311763 | 11/1995 |
| JP | A-09-024642 | 1/1997 |
| JP | A-09-034434 | 2/1997 |
| JP | A-09-044138 | 2/1997 |
| JP | A-09-171380 | 6/1997 |

OTHER PUBLICATIONS

Office Action issued in corresponding Japanese Patent Application No. 2009-067501 dated Feb. 25, 2011 (with translation).

* cited by examiner

*Primary Examiner* — Dov Popovici
(74) *Attorney, Agent, or Firm* — Oliff & Berridge, PLC

(57) ABSTRACT

A drawing processing apparatus is provided and includes: a plurality of character definition information memories each storing definition information on a character shape; a registering portion that, when a drawing command containing the definition information on the character shape is received, determines one of the plurality of character definition information memories for each character contained in the drawing command, depending on whether the definition information on the character shape is simple definition information that defines the character shape itself of the character or is a combinational definition information that defines a combination of simple or combinational definition information defining components of the character; and a drawing process instructing portion that instructs to read, from the plurality of character definition information memories, the definition information on the character shape corresponding to the character to be processed, to execute a drawing process of the each character contained in the drawing command.

15 Claims, 32 Drawing Sheets

FIG. 10A

*APPLICATION EXAMPLE OF FIRST EMBODIMENT*

<PRINT DATA: APPLICATION EXAMPLE OF FIRST EMBODIMENT>  *PSEUDO CODE

...

Define Font HYShortSamul — Medium <HYShortSamul — Medium DATA>
Define Glyph 54596 <Glyph54596(Composite) DATA>
Define Glyph 65607 <Glyph65607(Simple) DATA>
Define Glyph 65650 <Glyph65650(Simple) DATA>
Define Glyph 65681 <Glyph65681(Simple) DATA>
Define Glyph 54736 <Glyph54736(Composite) DATA>
Define Glyph 66257 <Glyph66257(Simple) DATA>
Draw (100,100) 10pt <54596>
Draw (100,120) 10pt <54736>

...

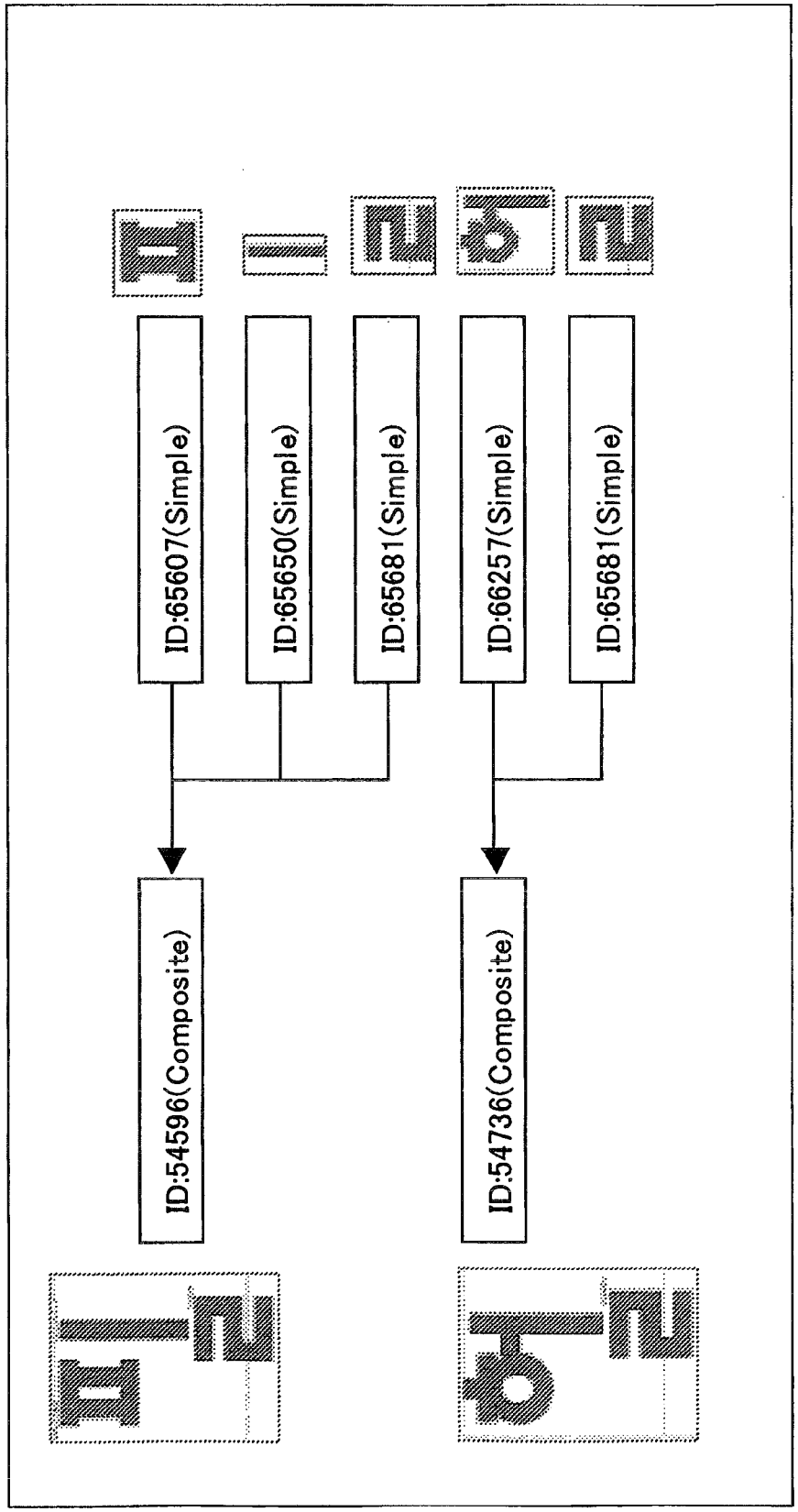
FIG. 10B <STRUCTURE OF COMPOSITE GLYPH: APPLICATION EXAMPLE OF FIRST EMBODIMENT>

FIG. 10C (1) FIRST SEARCH TABLE (TBL1)
   <APPLICATION EXAMPLE OF FIRST EMBODIMENT>

| FONT NAME: HYShortSamul – MEDIUM ||
|---|---|
| ID | GLYPH |
| 54596 | <Glyph 54596  DATA> |
| 65607 | <Glyph 65607  DATA> |
| 65650 | <Glyph 65650  DATA> |
| 65681 | <Glyph 65681  DATA> |
| 54736 | <Glyph 54736  DATA> |
| 66257 | <Glyph 66257  DATA> |

(2) SECOND SEARCH TABLE (TBL2)
   <APPLICATION EXAMPLE OF FIRST EMBODIMENT>

| FONT NAME: HYShortSamul – MEDIUM ||
|---|---|
| ID | GLYPH |
| 65607 | <Glyph 65607  DATA> |
| 65650 | <Glyph 65650  DATA> |
| 65681 | <Glyph 65681  DATA> |
| 66257 | <Glyph 66257  DATA> |

FIG. 10D

<BREAKDOWN OF HYShortSamul-MEDIUM GLYPH>

|  | NUMBER OF GLYPHS | OCCUPIED RATE |
|---|---|---|
| SIMPLE GLYPH | 1840 | 14% |
| COMPOSITE GLYPH | 11223 | 86% |

FIG. 12A

<PRINT DATA: APPLICATION EXAMPLE OF SECOND EMBODIMENT (FIRST EXAMPLE)>   *PSEUDO CODE

```
:
Define Font HYShortSamul   -   Medium <HYShortSamul   -   Medium DATA>
Define Glyph 54596 <Glyph54596(Composite) DATA>
Define Glyph 65607 <Glyph65607(Simple) DATA>
Define Glyph 65650 <Glyph65650(Simple) DATA>
Define Glyph 65681 <Glyph65681(Simple) DATA>
Define Glyph 54736 <Glyph54736(Composite) DATA>
Define Glyph 66257 <Glyph66257(Simple) DATA>
Define Glyph 20000 <Glyph20000(Composite) DATA>
Draw (100,100) 10pt <54596>
Draw (100,120) 10pt <20000>
:
```

FIG. 12C (1) FIRST SEARCH TABLE (TBL1)
<APPLICATION EXAMPLE OF SECOND EMBODIMENT (FIRST EXAMPLE)>

| FONT NAME: | HYShortSamul – MEDIUM |
|---|---|
| ID | GLYPH |
| 54596 | <Glyph 54596 DATA > |
| 65607 | <Glyph 65607 DATA > |
| 65650 | <Glyph 65650 DATA > |
| 65681 | <Glyph 65681 DATA > |
| 54736 | <Glyph 54736 DATA > |
| 66257 | <Glyph 66257 DATA > |
| 20000 | <Glyph 20000 DATA > |

(2) SECOND SEARCH TABLE (TBL2)
<APPLICATION EXAMPLE OF SECOND EMBODIMENT (FIRST EXAMPLE)>

| FONT NAME: | HYShortSamul – MEDIUM |
|---|---|
| ID | GLYPH |
| 65607 | <Glyph 65607 DATA > |
| 65650 | <Glyph 65650 DATA > |
| 65681 | <Glyph 65681 DATA > |
| 66257 | <Glyph 66257 DATA > |

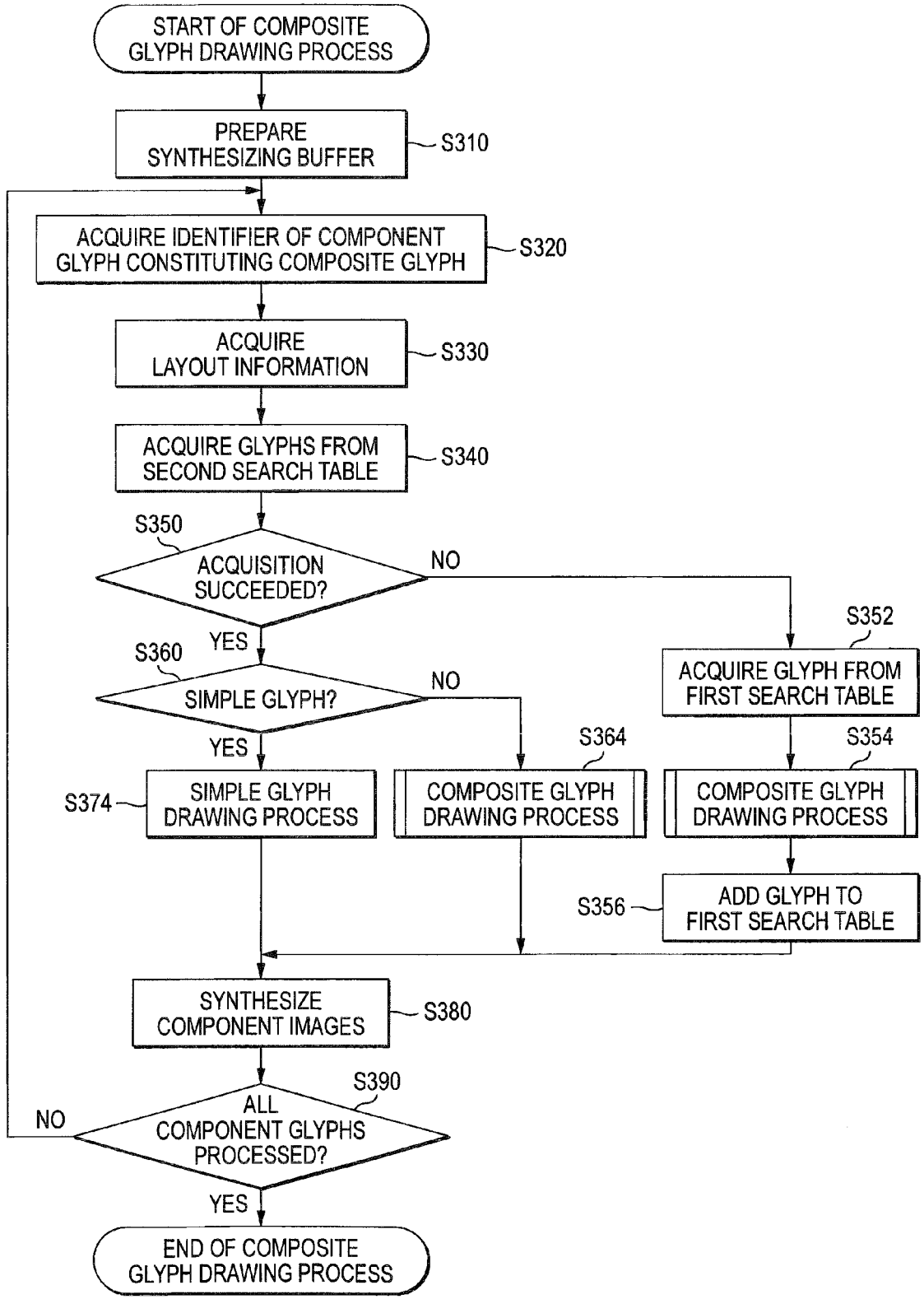

FIG. 15A

```
<PRINT DATA: APPLICATION EXAMPLE OF SECOND EMBODIMENT (SECOND EXAMPLE)> *PSEUDO CODE
...
Define Font HYShortSamul  -  Medium <HYShortSamul  - Medium DATA>
Define Glyph 54596 <Glyph54596(Composite) DATA>
Define Glyph 65607 <Glyph65607(Simple) DATA>
Define Glyph 65650 <Glyph65650(Simple) DATA>
Define Glyph 65681 <Glyph65681(Simple) DATA>
Define Glyph 54736 <Glyph54736(Composite) DATA>
Define Glyph 66257 <Glyph66257(Simple) DATA>
Define Glyph 20000 <Glyph20000(Composite) DATA>

Draw (100,100) 10pt <54596>
Draw (100,120) 10pt <20000>
  .....
Draw (100,180) 10pt <20000>
:
```

FIG. 15B (1) FIRST SEARCH TABLE (TBL1)
  <APPLICATION EXAMPLE OF SECOND EMBODIMENT (SECOND EXAMPLE)>

FONT NAME:    HYShortSamul – MEDIUM

| ID | GLYPH |
|---|---|
| 54596 | <Glyph 54596   DATA> |
| 65607 | <Glyph 65607   DATA> |
| 65650 | <Glyph 65650   DATA> |
| 65681 | <Glyph 65681   DATA> |
| 54736 | <Glyph 54736   DATA> |
| 66257 | <Glyph 66257   DATA> |
| 20000 | <Glyph 20000   DATA> |

(2) SECOND SEARCH TABLE (TBL2)
  <APPLICATION EXAMPLE OF SECOND EMBODIMENT (SECOND EXAMPLE)>

FONT NAME:    HYShortSamul – MEDIUM     *BEFORE DRAWING OF " GLYPH 20000"

| ID | GLYPH |
|---|---|
| 65607 | <Glyph 65607   DATA> |
| 65650 | <Glyph 65650   DATA> |
| 65681 | <Glyph 65681   DATA> |
| 66257 | <Glyph 66257   DATA> |

(3) SECOND SEARCH TABLE (TBL2)
  <APPLICATION EXAMPLE OF SECOND EMBODIMENT (SECOND EXAMPLE)>

FONT NAME:    HYShortSamul – MEDIUM     *AFTER DRAWING OF " GLYPH 20000"

| ID | GLYPH |
|---|---|
| 65607 | <Glyph 65607   DATA> |
| 65650 | <Glyph 65650   DATA> |
| 65681 | <Glyph 65681   DATA> |
| 66257 | <Glyph 66257   DATA> |
| 54736 | <Glyph 54736   DATA> |

FIG. 16A

<PRINT DATA: APPLICATION EXAMPLE OF SECOND EMBODIMENT (THIRD EXAMPLE)>  *PSEUDO CODE

```
...
Define Font HYShortSamul   -  Medium <HYShortSamul  - Medium DATA>
Define Glyph 65607 <Glyph65607(Simple) DATA>
Define Glyph 65681 <Glyph65681(Simple) DATA>
Define Glyph  20002  <Glyph 20002 (Composite) DATA>
Define Glyph 66257 <Glyph66257(Simple) DATA>
Define Glyph 2000  3  <Glyph2000 3 (Composite) DATA>
Define Glyph 2000  4  <Glyph2000 4 (Composite) DATA>
Draw (100,120) 10pt <2000  4>
:
```

<STRUCTURE OF COMPOSITE GLYPH: APPLICATION EXAMPLE OF SECOND EMBODIMENT (THIRD EXAMPLE)>

FIG. 16C (1) FIRST SEARCH TABLE (TBL1)
 <APPLICATION EXAMPLE OF SECOND EMBODIMENT (THIRD EXAMPLE)>

| FONT NAME: | HYShortSamul − MEDIUM |
|---|---|
| ID | GLYPH |
| 65607 | <Glyph65607  DATA> |
| 65681 | <Glyph65681  DATA> |
| 20002 | <Glyph20002  DATA> |
| 66257 | <Glyph66257  DATA> |
| 20003 | <Glyph20003  DATA> |
| 20004 | <Glyph20004  DATA> |

(2) SECOND SEARCH TABLE (TBL2)
 <APPLICATION EXAMPLE OF SECOND EMBODIMENT (THIRD EXAMPLE)>
 *BEFORE DRAWING OF "GLYPH 20004"

| FONT NAME: | HYShortSamul − MEDIUM |
|---|---|
| ID | GLYPH |
| 65607 | <Glyph65607  DATA> |
| 65681 | <Glyph65681  DATA> |
| 66257 | <Glyph66257  DATA> |

(3) SECOND SEARCH TABLE (TBL2)
 <APPLICATION EXAMPLE OF SECOND EMBODIMENT (THIRD EXAMPLE)>
 *AFTER DRAWING OF "GLYPH 20004"

| FONT NAME: | HYShortSamul − MEDIUM |
|---|---|
| ID | GLYPH |
| 65607 | <Glyph65607  DATA> |
| 65681 | <Glyph65681  DATA> |
| 66257 | <Glyph66257  DATA> |
| 20002 | <Glyph20002  DATA> |
| 20003 | <Glyph20003  DATA> |

FIG. 20A

<PRINT DATA: APPLICATION EXAMPLE OF THIRD EMBODIMENT>   *PSEUDO CODE

```
...
Define Font HYShortSamul — Medium <HYShortSamul — Medium DATA>
Define Glyph 54596 <Glyph54596(Composite) DATA>
Define Glyph 65607 <Glyph65607(Simple) DATA>
Define Glyph 65650 <Glyph65650(Simple) DATA>
Define Glyph 65681 <Glyph65681(Simple) DATA>
Define Glyph 54736 <Glyph54736(Composite) DATA>
Define Glyph 66257 <Glyph66257(Simple) DATA>
Draw (100,100) 10pt <54596>
Draw (100,120) 10pt <54736>
Draw (100,140) 10pt <54596>
Draw (120,100) 12pt <54596>
...
```

FIG. 20B (1) CHARACTER CACHE TABLE IN CHARACTER CACHE MEMORY PORTION
   <APPLICATION EXAMPLE OF THIRD EMBODIMENT>

*INITIAL STATE

| FONT NAME | ID | SIZE | BITMAP DATA |
|---|---|---|---|
|  |  |  |  |

(2) CHARACTER CACHE TABLE IN CHARACTER CACHE MEMORY PORTION
   <APPLICATION EXAMPLE OF THIRD EMBODIMENT>

*DRAW (100, 100) 10pt AFTER <54596>

| FONT NAME | ID | SIZE | BITMAP DATA |
|---|---|---|---|
| HYShortSamul-MEDIUM | 54596 | 10pt | <bitmap DATA> |

(3) CHARACTER CACHE TABLE IN CHARACTER CACHE MEMORY PORTION
   <APPLICATION EXAMPLE OF THIRD EMBODIMENT>

*DRAW (100, 120) 10pt AFTER <54736>

| FONT NAME | ID | SIZE | BITMAP DATA |
|---|---|---|---|
| HYShortSamul-MEDIUM | 54596 | 10pt | <bitmap DATA> |
| HYShortSamul-MEDIUM | 54736 | 10pt | <bitmap DATA> |

(4) CHARACTER CACHE TABLE IN CHARACTER CACHE MEMORY PORTION
   <APPLICATION EXAMPLE OF THIRD EMBODIMENT>

*DRAW (120, 100) 12pt AFTER <54596>

| FONT NAME | ID | SIZE | BITMAP DATA |
|---|---|---|---|
| HYShortSamul-MEDIUM | 54596 | 10pt | <bitmap DATA> |
| HYShortSamul-MEDIUM | 54736 | 10pt | <bitmap DATA> |
| HYShortSamul-MEDIUM | 54596 | 12pt | <bitmap DATA> |

FIG. 20C (1) COMPONENT CACHE TABLE IN COMPONENT CACHE MEMORY PORTION
   <APPLICATION EXAMPLE OF THIRD EMBODIMENT>

*INITIAL STATE

| FONT NAME | ID | SIZE | BITMAP DATA |
|---|---|---|---|

(2) COMPONENT CACHE TABLE IN COMPONENT CACHE MEMORY PORTION
   <APPLICATION EXAMPLE OF THIRD EMBODIMENT>

*ID65607 & 10pt ADD

| FONT NAME | ID | SIZE | BITMAP DATA |
|---|---|---|---|
| HYShortSamul-MEDIUM | 65607 | 10pt | <bitmap DATA> |

(3) COMPONENT CACHE TABLE IN COMPONENT CACHE MEMORY PORTION
   <APPLICATION EXAMPLE OF THIRD EMBODIMENT>

*ID65650, 65681 & 10pt ADD

| FONT NAME | ID | SIZE | BITMAP DATA |
|---|---|---|---|
| HYShortSamul-MEDIUM | 65607 | 10pt | <bitmap DATA> |
| HYShortSamul-MEDIUM | 65650 | 10pt | <bitmap DATA> |
| HYShortSamul-MEDIUM | 65681 | 10pt | <bitmap DATA> |

(4) COMPONENT CACHE TABLE IN COMPONENT CACHE MEMORY PORTION
   <APPLICATION EXAMPLE OF THIRD EMBODIMENT>

*ID66257 & 10pt ADD

| FONT NAME | ID | SIZE | BITMAP DATA |
|---|---|---|---|
| HYShortSamul-MEDIUM | 65607 | 10pt | <bitmap DATA> |
| HYShortSamul-MEDIUM | 65650 | 10pt | <bitmap DATA> |
| HYShortSamul-MEDIUM | 65681 | 10pt | <bitmap DATA> |
| HYShortSamul-MEDIUM | 66257 | 10pt | <bitmap DATA> |

(5) COMPONENT CACHE TABLE IN COMPONENT CACHE MEMORY PORTION
<APPLICATION EXAMPLE OF THIRD EMBODIMENT>

*ID65607 & 12pt ADD

| FONT NAME | ID | SIZE | BITMAP DATA |
|---|---|---|---|
| HYShortSamul-MEDIUM | 65607 | 10pt | <bitmap DATA> |
| HYShortSamul-MEDIUM | 65650 | 10pt | <bitmap DATA> |
| HYShortSamul-MEDIUM | 65681 | 10pt | <bitmap DATA> |
| HYShortSamul-MEDIUM | 66257 | 10pt | <bitmap DATA> |
| HYShortSamul-MEDIUM | 65607 | 12pt | <bitmap DATA> |

(6) COMPONENT CACHE TABLE IN COMPONENT CACHE MEMORY PORTION
<APPLICATION EXAMPLE OF THIRD EMBODIMENT>

*ID65650, 65681 & 12pt ADD

| FONT NAME | ID | SIZE | BITMAP DATA |
|---|---|---|---|
| HYShortSamul-MEDIUM | 65607 | 10pt | <bitmap DATA> |
| HYShortSamul-MEDIUM | 65650 | 10pt | <bitmap DATA> |
| HYShortSamul-MEDIUM | 65681 | 10pt | <bitmap DATA> |
| HYShortSamul-MEDIUM | 66257 | 10pt | <bitmap DATA> |
| HYShortSamul-MEDIUM | 65607 | 12pt | <bitmap DATA> |
| HYShortSamul-MEDIUM | 65650 | 12pt | <bitmap DATA> |
| HYShortSamul-MEDIUM | 65681 | 12pt | <bitmap DATA> |

DRAWING PROCESSING APPARATUS, IMAGE OUTPUTTING APPARATUS, METHOD FOR DRAWING PROCESSING AND COMPUTER READABLE MEDIUM

CROSS-REFERENCE TO RELATED APPLICATION

This application is based on and claims priority under 35 USC §119 from Japanese Patent Application No. 2009-067501 filed Mar. 19, 2009.

BACKGROUND (i) Technical Field

The present invention relates to a drawing processing apparatus, an image outputting apparatus, a method for drawing processing, and a computer readable medium.

(ii) Related Art

For example, a setup for drawing processing is employed in such a situation that electronic data prepared by a document formulating tool such as a word processor software, a spreadsheet software, or the like should be printed/output by an image forming apparatus such as a printer, or the like or be displayed/output by an image display device having a display device such as CRT, LCD (liquid crystal display), or the like.

Here, there is a setup for utilizing the cache search when the character drawing process should be executed.

SUMMARY

According to an aspect of the present invention, there is provided a drawing processing apparatus, including:

a plurality of character definition information memories each storing definition information on a character shape;

a registering portion that, when a drawing command containing the definition information on the character shape is received, determines one of the plurality of character definition information memories for each character contained in the drawing command, depending on whether the definition information on the character shape is simple definition information that defines the character shape itself of the character or is a combinational definition information that defines a combination of simple or combinational definition information defining components of the character; and a drawing process instructing portion that instructs to read, from the plurality of character definition information memories, the definition information on the character shape corresponding to the character to be processed, to execute a drawing process of the each character contained in the drawing command.

BRIEF DESCRIPTION OF THE DRAWINGS

Embodiments of the present invention will be described in detail based on the following figures, wherein:

FIG. 10A is a view showing print data used in an application example of the first embodiment;

FIG. 10B is a view explaining a structure of the composite glyph used in print data shown in FIG. 10A;

FIG. 10C is a view showing an example of registered information of a search table in an application example of the first embodiment;

FIG. 10D is a view explaining occupied rates of a composite glyph and a simple glyph in font data used in an application example of the first embodiment;

FIG. 12A is a view showing print data used in the second embodiment (first example);

FIG. 12C is a view showing an example of registered information of a search table in an application example of the second embodiment (first example);

FIG. 14 is a flowchart explaining details of processing procedures in a composite glyph character drawing process of the second embodiment (second example).

FIG. 15A is a view showing print data used in an application example of the second embodiment (second example);

FIG. 15B is a view showing an example of registered information of a search table in an application example of the second embodiment (second example);

FIG. 16A is a view showing print data used in an application example of the second embodiment (third example);

FIG. 16C is a view showing an example of registered information of a search table in an application example of the second embodiment (third example);

FIG. 20A is a view showing print data used in an application example of the third embodiment;

FIG. 20B is a view showing an example of registered information in a character cache memory portion in an application example of the third embodiment;

FIG. 20C is a view showing an example of registered information in a component cache memory portion in an application example of the third embodiment.

DETAILED DESCRIPTION

Exemplary embodiments of the present invention will be explained in detail with reference to the drawings hereinafter.

An image outputting apparatus may be constructed by an image forming apparatus (so-called printing machine) in such a mode that the characters are printed/output on a printing medium such as a paper, OHP (Over Head Projector), or the like, or may be constructed by a display device in such a mode that the characters are displayed on a displaying medium such as a liquid crystal display, CRT (cathode Ray Tube), or the like. Explanation will be made by taking a printing system, which employs the printing machine as the image outputting apparatus, as a typical example hereinafter.

<System Configuration>

Figure 1:
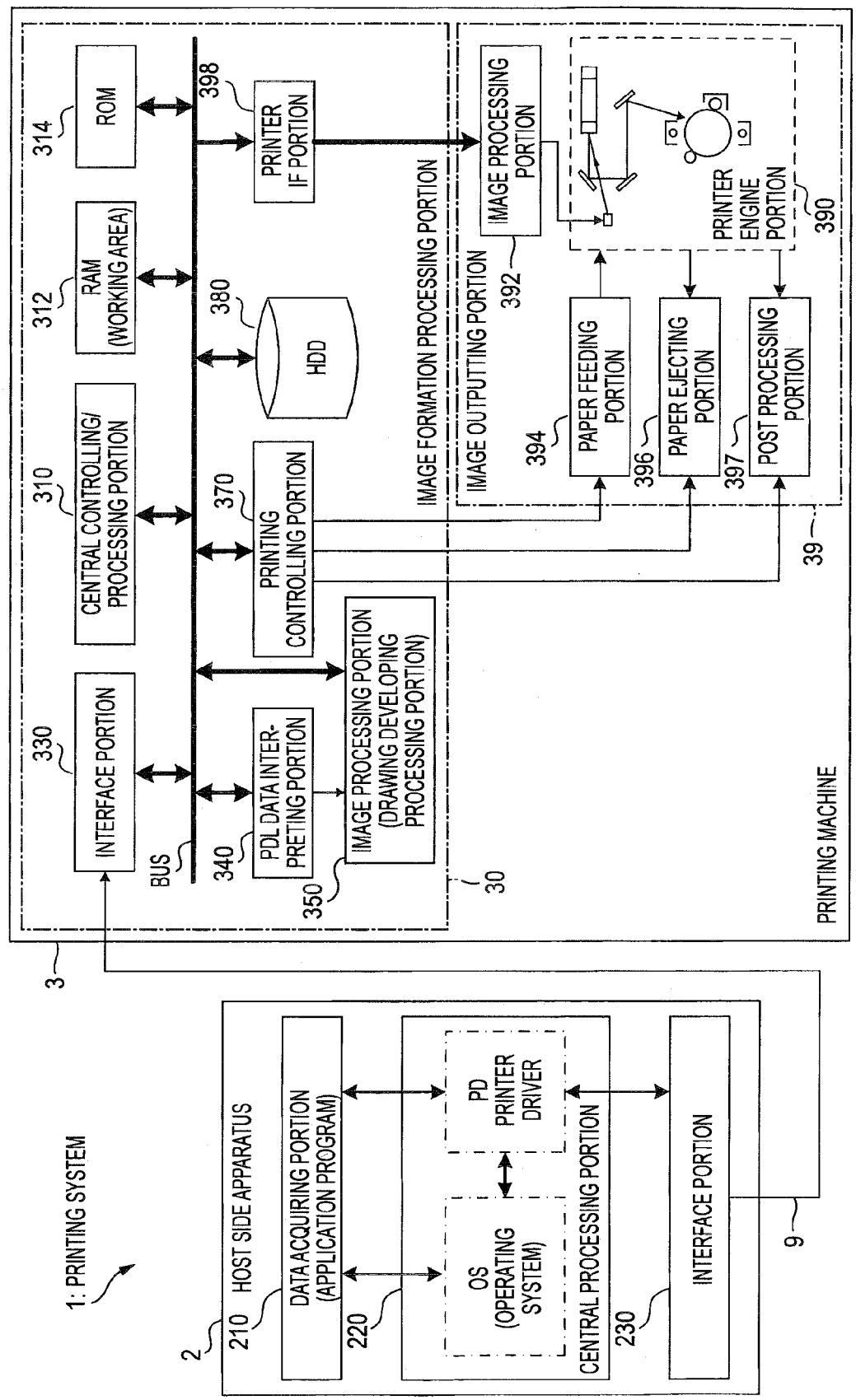
FIG. 1 is a diagram showing a printing system according to an exemplary embodiment of an image outputting system.

FIG. 1 is a diagram showing a printing system according to an exemplary embodiment of an image outputting system. In a printing system 1 of the present embodiment, a host side apparatus 2 that a client uses and a printing machine 3 as an example of the image outputting apparatus constructed by utilizing SOC are connected via a transmission line 9 (communication line) as an example of the communication channels. The printing machine 3 may be composed of a single-function machine (so-called printer) equipped with a printing function only or a multifunction machine equipped with not only a printing function but also other functions such as a copier, FAX, etc.

As the transmission line 9, a wired communication line such as LAN (Local Area Network), a telephone line, or the like, a wireless communication line such as a wireless LAN, or the like, a combination of these communication lines, or the like can be applied.

As a system configuration, the printing machine 3 is constructed as an example of the image forming apparatus containing the image processing apparatus with SOC, and then the printing system 1 is constructed as an example of the image outputting system containing the printing machine 3.

The host side apparatus 2 is an example of an image supplying device that supplies an image as a processing object to the printing machine 3. The host side apparatus 2 is provided to produce and output document data containing characters, figures, and photos, and the personal computer is employed, for example. Document data containing characters/figures/photos formulated by the host side apparatus 2 are fed to the printing machine 3 as print data (PDL data) described by PDL (Page Description Language). In the PDL data, images (photos, images), figures (graphics), characters, etc. can be handled similarly, and also enlargement/rotation/transformation of the figures, the characters, etc. can be controlled freely.

[Host Side Apparatus]

The host side apparatus 2 functions as an information processing portion, and has a data acquiring portion 210 for producing image data such as document, figure, etc., a central processing portion 220 for controlling operations of respective portions of the host side apparatus 2, and an interface portion 230 (IF portion) for performing an interface function to the printing machine 3. Although not shown, a memory device such as a hard disc, or the like or a memory portion composed of RAM (Random Access Memory), ROM (Read Only Memory), or the like is also provided.

An application program used to produce the data such as documents, figures, etc., for example, is installed into the data acquiring portion 210. In this case, the data acquiring portion 210 may be constructed to fetch the data produced by the external device and feed them to the print output.

An OS (Operating System) as the software used to control the overall of the host side apparatus 2 and a printer driver PD as the software used to control the printing machine 3 are installed into the central processing portion 220.

Accordingly, the host side apparatus 2 implements a device, which issues the print command to the printing machine 3, by software based on a program. In other words, respective functions are implemented by software when the program is read from CD-ROM, or the like, which stores the program used to constitute respective function portions, and is installed into a hard disc drive, or the like (not shown) and then CPU (Central Processing Unit) or MPU (Micro Processing Unit)(not shown) constituting the central processing portion 220 reads the program from the hard disc drive and executes predetermined process procedures.

The hardware and various devices and various softwares in the host side apparatus 2 are controlled/managed by the operating system OS. The application program operates under control and management made by the operating system OS. The application program issues the command to print characters, images, etc. Here, it is assumed that the contents to be printed are output as drawing information described by the page description language.

For example, the drawing command having command types such as image drawing command, graphic drawing command, font drawing command, and the like are input sequentially into the printer driver PD from the application program that is installed into the host side apparatus 2.

Normally, the printer driver PD is attached to the printing machine 3, and provided as the program that operates when it is loaded on the host side apparatus 2. Also, the printer driver PD is used to correlate the host side apparatus 2 with various data formats the use of which in the particular printing machine 3 is supposed. When the printer driver PD receives drawing information from the application program, it executes various process steps before the information is sent to the printing machine 3. For example, the printer driver PD converts the drawing information received from the application program into the commands and a series of drawing objects that the printing machine 3 can interpret, and transmits them.

In the present embodiment, the printer driver PD converts the drawing command into the PDL data as the print command that the printing machine 3 can understand, and outputs such PDL data to the interface portion 230. The print command being input into the interface portion 230 is sent to the printing machine 3 through the transmission line 9 (the connection cable or the network). The printing machine 3 prints the image (outputs the image) on a paper in compliance with the received PDL data.

[Printing Machine]

The printing machine 3 is an example of the image outputting apparatus, and executes the printing process based on the print data (PDL data) output from the host side apparatus 2. The print data formulated in PDL herein is constructed by the commands and data sequence, in which the drawing commands and the data used to express images, figures, characters in any positions in a page are arranged in any order. The printing machine 3 is a page printer, and applies the rendering (drawing development) to image data every output unit (every one page) prior to the printing and outputs the raster data to a printer engine portion.

In order to implement such functions, the printing machine 3 includes an image formation processing portion 30 having a semiconductor integrated circuit called SOC (System On a Chip), and an image outputting portion 39 for executing the printing process based on the image data fed from the image formation processing portion 30.

The image formation processing portion 30 has a central controlling/processing portion 310, a RAM 312, a ROM 314, an interface portion 330, a PDL data interpreting portion 340 (interpreter portion), and an image processing portion (drawing development processing portion) 350 as an example of the image processing apparatus that functions as the drawing processing apparatus. Also, the image formation processing portion 30 has a printing controlling portion 370 (output controlling portion), and a hard disc drive 380 (HDD).

The central controlling/processing portion 310 controls the overall portions of the printing machine 3. For example, the central controlling/processing portion 310 executes the image forming process (imaging process) based on the control program and the application program that are read into the RAM 312 from the ROM 314. In executing the image forming process, the central controlling/processing portion 310 puts the image processing portion 350 in charge of at least a part of the image forming process, and completes the image forming process as a whole in corporation with the image processing portion 350.

The interface portion 330 fulfills an interface function between the host side apparatus 2 and the printing machine 3. For example, the interface portion 330 transfers the data between the host side apparatus 2 and the printing machine 3 via the transmission line 9, and receives the print data in the PDL format sent from (the printer driver to) the printing machine 3.

The PDL data interpreting portion 340 is an example of a drawing command outputting device that interprets the PDL data and transfers the obtained drawing command to the image processing portion 350. The PDL data interpreting portion 340 recognizes the fetched drawing information, a sequence of the command and the drawing data, etc., and interprets the commands by assembling them into the command and the argument.

The image processing portion 350 executes graphics drawing, character drawing, and image drawing based on the interpretation command received from the PDL data interpreting portion 340, and produces bitmap data (also called the raster data). At this time, the image processing portion 350 causes the RAM 312 and the hard disc drive 380 to store once the produced data. For example, in the case of color printing, the image processing portion 350 rasterizes the data into four planes of C (cyan), M (magenta), Y (yellow), and K (black) every color, for example, and then stores the rasterized data individually in the page memory areas (page buffers) of the hard disc drive 380. In this case, the page memory area may be kept in the RAM 312 in place of the hard disc drive 380.

Also, in the present embodiment, when the characters as the processing object are glyphs (definition information on character shapes), the hard disc drive 380 or the RAM 312 is utilized as the memory areas of glyph data. Also, when the characters as the processing object are glyphs and also the glyphs are composite glyphs, the data produced in the drawing process of respective glyphs constituting the composite glyph are stored once in the glyph memory areas (synthesizing buffers) of the RAM 312 or the hard disc drive 380.

Also, in the present embodiment, when the operation is set to the mode in which a cache searching function is applied, the hard disc drive 380 or the RAM 312 is utilized as the memory areas of cache data.

The printing controlling portion 370 is an example of the output controlling portion, and controls the printing process of a printer engine portion 390 based on the bitmap data whose drawing is developed by the image processing portion 350. The printer engine portion 390 executes the printing process in compliance with the command of the printing controlling portion 370. A printer IF portion 398 is provided between the printer engine portion 390 and the system bus. The printer engine portion 390 is an example of the image forming portion (image outputting portion) that forms the image on an output media based on the data being processed by the image processing portion 350.

The printing controlling portion 370 starts the printer engine portion 390 in executing the printing, and supplies the bitmap data in output unit to the printer engine portion 390 via the printer IF portion 398.

The hard disc drive 380 is an example of the nonvolatile memory medium. Also, the hard disc drive 380 also functions as an example of the data storing portion that not only stores the raster data produced by the image processing portion 350 but also temporarily stores the drawing object and the drawing operation command (also called collectively the drawing command) that are interpreted/transformed by the PDL data interpreting portion 340.

The image outputting portion 39 executes the printing process as an example of the image outputting process, based on the image data that is accepted from the image formation processing portion 30. In order to implement this function, the image outputting portion 39 is equipped with the printer engine portion 390, an image processing portion 392, a paper feeding portion 394, a paper ejecting portion 396, a post processing portion 397, and the printer IF portion 398.

The printer engine portion 390 is an example of the output processing portion, and forms the image on a paper in accordance with the bitmap fed via the printer IF portion 398. That is, the printer engine portion 390 forms actually the image on a recorded medium in accordance with the image data stored in the page memory areas. As the printer engine portion 390, various types of recording methods including the laser system, for example, may be employed. At this time, in some cases the binarization process or the screen process may be executed in the image processing portion 392.

The paper feeding portion 394 has one or plural paper feeding trays, although not shown, and contains the paper as an example of the printing medium that is fed to the printer engine portion 390.

The paper ejecting portion 396 has a paper output tray, although not shown, on which the paper that underwent the printing process by the printer engine portion 390 is ejected. When the paper ejecting portion 396 receives a rotation command as well as a rotation angle from the printing controlling portion 370, it rotates the paper at a rotation angle given by the rotation command and then ejects the paper.

When the post processing command is attached to the printing command, the post processing portion 397 executes the post processing in accordance with the command. As the "post processing", for example, there are the staple process for binding the output papers by the stapler (the papers are bound along the short side or the long side), the punching process for punching the papers along the short side or the long side, and the like.

Image Processing Portion

First Embodiment

[Apparatus Configuration]

Figure 2:
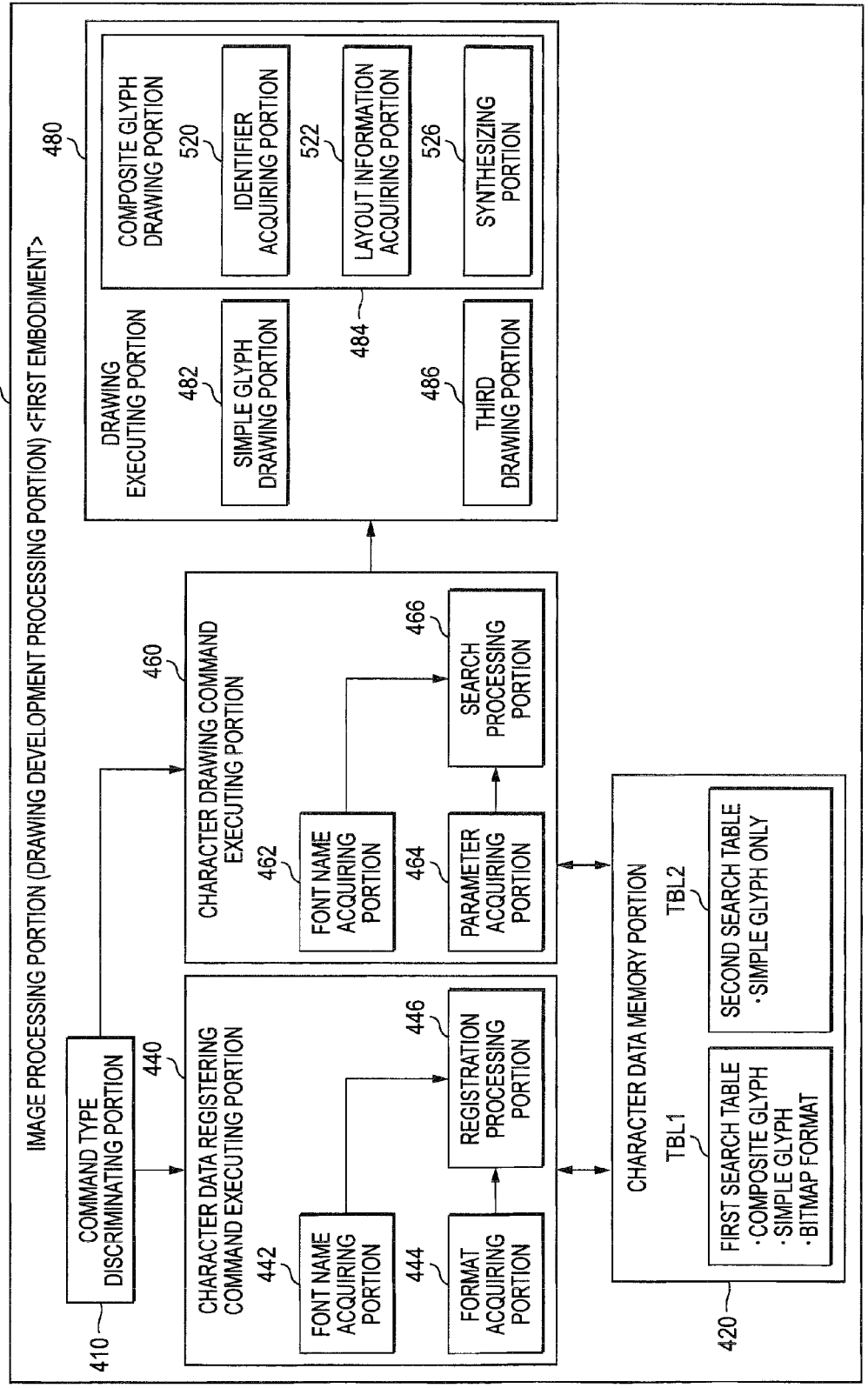
FIG. 2 is a diagram showing an image processing portion according to a first exemplary embodiment of the present invention.

FIG. 2 is a diagram showing an image processing portion 350A of a first exemplary embodiment of the present invention. Here, the memory areas of glyph data are contained in the image processing portion 350A. However, such configuration is not essential to the present invention, and normally the hard disc drive 380 and the RAM 312 are utilized as the memory area, as described above.

The image processing portion 350A is equipped with a command type discriminating portion 410, a character data memory portion 420, a character data registering command executing portion 440, a character drawing command executing portion 460, and a drawing executing portion 480.

The command type discriminating portion 410 is an example of the drawing command type discriminating portion, and acquires the command of the print data and discriminates the type of the command.

The character data memory portion 420 is an example of the character definition information memory portion for storing the definition information on character shapes, and has a first search table TBL1 and a second search table TBL2.

The character data registering command executing portion 440 is an example of the character information registering portion. This character information registering portion decides in which one of the first search table TBL1 and the second search table TBL2 the glyphs (definition information on character shapes) of respective characters should be registered, in response to whether the glyph corresponds to the simple glyph (character shape defining information (simple definition information)) used to define the font or the composite glyph (combination defining information) used to define a combination of the simple or combinational definition information. The character data registering command executing portion 440 has a font name acquiring portion 442, a format acquiring portion 444, and a registration processing portion 446.

The font name acquiring portion 442 is an example of the font name acquiring portion, and acquires a name of the font of the character.

The format acquiring portion 444 is an example of the format acquiring portion, and acquires a format of the font.

The registration processing portion 446 processes register commands of the characters sequentially, and registers both the composite glyph and the simple glyph in the first search table TBL1 and also registers the simple glyph in the second search table TBL2.

In the present embodiment, particularly a feature resides in the handling of the glyph, but actually the character data in the bitmap format are accepted sometimes. In order to deal with such case, the registration processing portion 446 registers both the glyph data in the true type format and the character data in the bitmap format in the first search table TBL1.

The character drawing command executing portion 460 is an example of the character drawing process commanding portion. This character drawing process commanding portion instructs to execute the character drawing process with respect to respective characters contained in the drawing command (print data), by reading the definition information on a character shape (glyph) corresponding to the characters of the processing object from the character data memory portion 420 (the first search table TBL1 and the second search table TBL2). This character drawing command executing portion 460 has a font name acquiring portion 462, a parameter acquiring portion 464, and a search processing portion 466.

The font name acquiring portion 462 is an example of the font name acquiring portion, and acquires a name of the font of the character, like the font name acquiring portion 442.

The parameter acquiring portion 464 is an example of the variable acquiring portion, and acquires variables such as size, color, etc. in drawing the characters.

The search processing portion 466 processes sequentially the drawing commands of the characters. The search processing portion 466 acquires the composite glyph from the first search table TBL1 and acquires the simple glyph from the second search table TBL2, and transfers respective acquired glyphs to the drawing executing portion 480.

The drawing executing portion 480 has a simple glyph drawing portion 482 (first drawing portion), a composite glyph drawing portion 484 (second drawing portion), and a third drawing portion 486.

The simple glyph drawing portion 482 takes charge of the drawing process of the simple glyph. The composite glyph drawing portion 484 takes charge of the drawing process of the composite glyph. The third drawing portion 486 takes charge of the drawing process of other characters and figures (graphics) and the photo (image) except the simple glyph and the composite glyph.

The glyph drawing portion 484 has an identifier acquiring portion 520, a layout information acquiring portion 522, and a synthesizing portion 526. The identifier acquiring portion 520 acquires an identifier (ID) for specifying the glyph constituting the composite glyph. The layout information acquiring portion 522 acquires the information of the layout position of the glyph constituting the composite glyph. The synthesizing portion 526 produces the synthesized image of the composite glyph by drawing the image (component image) of the simple glyph constituting the composite glyph produced by the simple glyph drawing portion 482 on the synthesizing buffer.

<Problem in Character Drawing Process and Principle of Improving Approach>

The character in the true type font format is called the glyph (definition information on the character shape). As the glyph, there are the simple glyph (character shape definition information (simple definition information)) that defines a form of the character shape itself and the composite glyph (combination definition information) that defines a combination of plural glyphs.

For example, in the Hangul characters, one character is constructed by combining respective symbols indicating a vowel and a consonant. In the true type font, each symbol is constructed by the simple glyph and the actual character is constructed by the composite glyph.

For example, in the PCL5/6 in the page description language (PDL), the setup being called the soft font or the down-loadable font, which embeds the necessary glyph out of the font data located in the host side apparatus 2 into the print data, is provided. When the printing machine 3 receives respective glyphs in terms of the soft font from the host side apparatus 2, such printing machine 3 stores respective glyphs without distinction in the search table. Both the simple glyph and the composite glyph are contained in the search table.

In this case, when the true type font in the composite format is sent as the soft font, the character drawing process is executed upon drawing (rasterizing) one character via such procedures that first the composite glyph is acquired from the search table and then the simple glyphs constituting the composite glyph being acquired from the search table is acquired from the same search table. In the composite glyph character drawing, the glyph search must be applied several times to the search table in which both the simple glyph and the composite glyph are contained and which contains a large number of registrations. As a result, the character drawing process of the composite glyph is delayed.

Also, in the drawing process of the simple glyph, the simple glyph search must be applied to the search table in which both the simple glyph and the composite glyph are contained and which contains a large number of registrations. As a result, the composite glyph that is never hit is selected as the searching object (the needless search is executed), and thus the character drawing process of the simple glyph is also delayed.

Also, the character drawing setup for storing the bitmap data of the characters and then utilizing the cache search may be considered. For example, the font data is stored in the memory portion every plural components constituting the character. The bitmap data are produced from the stored font data, and then these bitmap data are stored in the component cache memory portion. Then, the bitmap data of the character are produced by coupling these component bitmap data together. This setup is employed to speed up by caching the drawing process result every simple glyph.

However, in this caching, the cache cannot be used after the character is edited (e.g., the size is changed). In the case of the composite glyph, sometimes respective glyphs are combined together after the scaling. In such case, the caches of respective simple glyphs are not used repeatedly, and such a situation may happen that the cache function does not effectively serve. When the cache function is not effective, the search is also delayed like the case where no cache function is provided.

On the contrary, in the present embodiment, in the printing machine 3, a plurality of search tables are prepared as the search table (character definition information memory portion) of the character data memory portion 420, and the registration destination (stored address) is switched in response to whether each glyph corresponds to the simple glyph or the composite glyph.

As approaches to preparation of a plurality of search tables, first the search table is prepared separately for the composite glyph and the simple glyph. That is, a first approach that prepares two types of search tables, i.e., a composite glyph dedicated search table and a simple glyph dedicated search table, may be considered.

Also, a combination of a mixed search table, which stores all received glyphs (i.e., the composite glyph and the simple glyph are stored mixedly), and an individual search table, which stores mainly any one of the simple glyph and the composite glyph (in the first embodiment, "only"), may be considered. In this case, it is preferable that the glyph whose rate (occupied rate) occupied in all glyphs of a certain font is smaller should be applied to the individual search table. For example, when an occupied rate of the simple glyphs is lower than an occupied rate of the composite glyphs, a second approach that reduces the number of registrations smaller than that in the mixed search table by preparing the individual search table for the simple glyph may be employed. Upon drawing the simple glyph, the drawing is executed by acquiring the simple glyph from the individual search table for the simple glyph whose number of registrations is smaller.

Also, when an occupied rate of the composite glyphs is lower than an occupied rate of the simple glyphs, a third approach that reduces the number of registrations smaller than that in the mixed search table by preparing the individual search table for the composite glyph may be considered. Upon drawing the composite glyph, the drawing is executed by acquiring the composite glyph from the individual search table for the composite glyph whose number of registrations is smaller, and then acquiring the simple glyphs constituting the composite glyph from the mixed search table. However, this third approach can be considered merely on a principle-basis, and it may be considered that actually the advantage is minor.

In such a situation that two search tables are prepared, it is preferable that, when the glyph (definition information) defined by the composite glyph (combination definition information) cannot be read from one search table (character definition information memory portion), such glyph should be read in the character drawing process by searching the other search table (character definition information memory portion). In this case, it is more preferable that, after the character drawing process based upon the command of this drawing process is completed, the glyph defined by the composite glyph should also be registered in one search table.

In the first embodiment (also the second embodiment described later), the second approach out of these combinations is adopted on the basis of the application examples described later. When respective glyphs are received in terms of the soft font from the host side apparatus 2, it is discriminated that respective glyphs correspond to either the simple glyph or the composite glyph, and the first search table TBL1 (conventional table) for containing both the simple glyph and the composite glyph and the second search table TBL2 for containing only the simple glyph are compiled.

In the character drawing process, an identifier (ID) of the character (glyph) is specified at first. In the printing machine 3, the glyph of the character is acquired from the first search table TBL1. When the acquired glyph is the composite glyph, respective simple glyphs constituting the composite glyph are searched from the second search table TBL2 prepared for the simple glyph.

Overall Operation

First Embodiment

Figure 3:
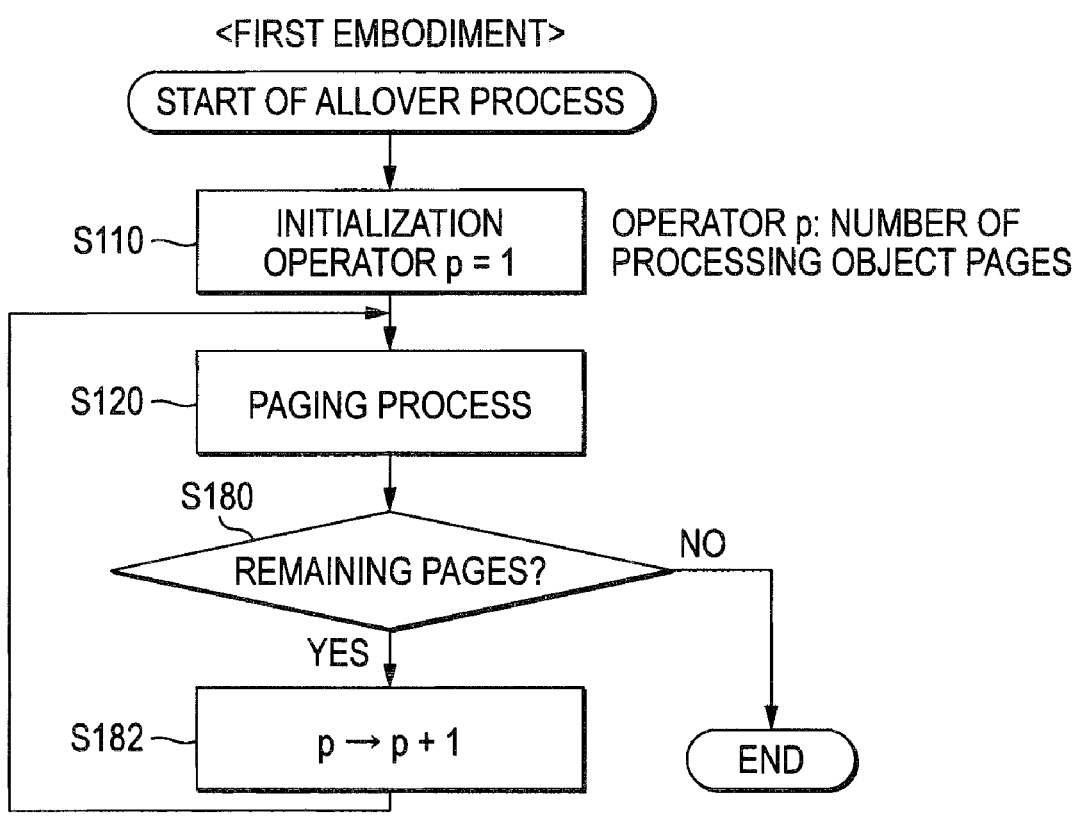
FIG. 3 is a flowchart explaining overall processing procedures of a character drawing process of the first embodiment.

FIG. 3 is a flowchart explaining overall processing procedures of the character drawing process of the first embodiment.

When the document outputting process is started, the image processing portion 350A sets an operator p of the processing object page to "1" (S110).

Then, the image processing portion 350A executes a paging process of the processing object page p (S120).

When the paging process is completed, the image processing portion 350A checks whether or not remaining pages are present (S180). If the remaining pages are present (S180—YES), the operator p of the processing object page is incremented by "1" (S182). Then, the process goes back to the paging process (S120), and then a process of a next page is executed.

Drawing Developing Process

First Embodiment

Figure 4:
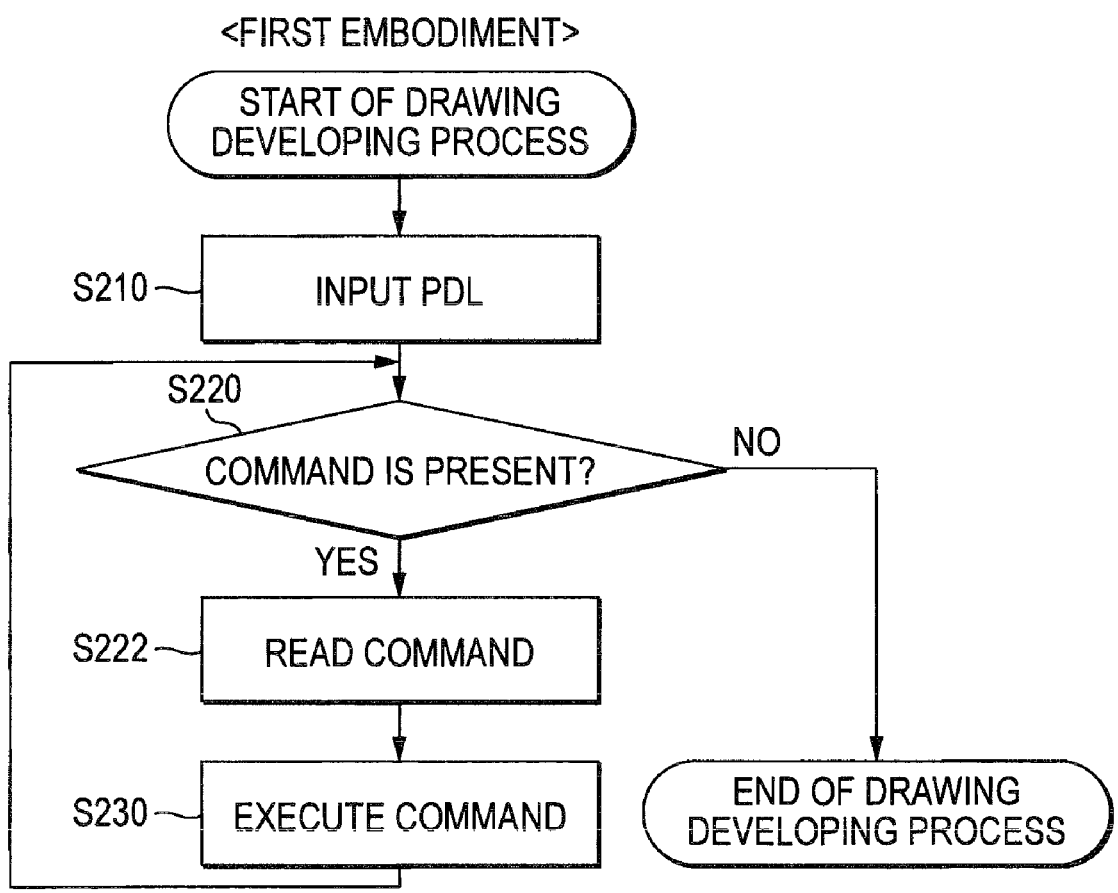
FIG. 4 is a flowchart explaining processing procedures of a drawing developing process in respective page processes of the first embodiment.

FIG. 4 is a flowchart explaining processing procedures of the drawing developing process in respective page processes of the first embodiment.

In each paging process, first the PDL data interpreting portion 340 receives the PDL data (S210), and then transfers the drawing command derived by interpreting the PDL data to the image processing portion 350A. The image processing portion 350A produces the bitmap data based on the drawing command.

At this time, the image processing portion 350A checks whether or not the command is present (S220). If the command is present (S220—YES), the image processing portion 350A reads the command (S222), and does the read command executing process (S230).

Command Executing Process

First Embodiment

Figure 5:
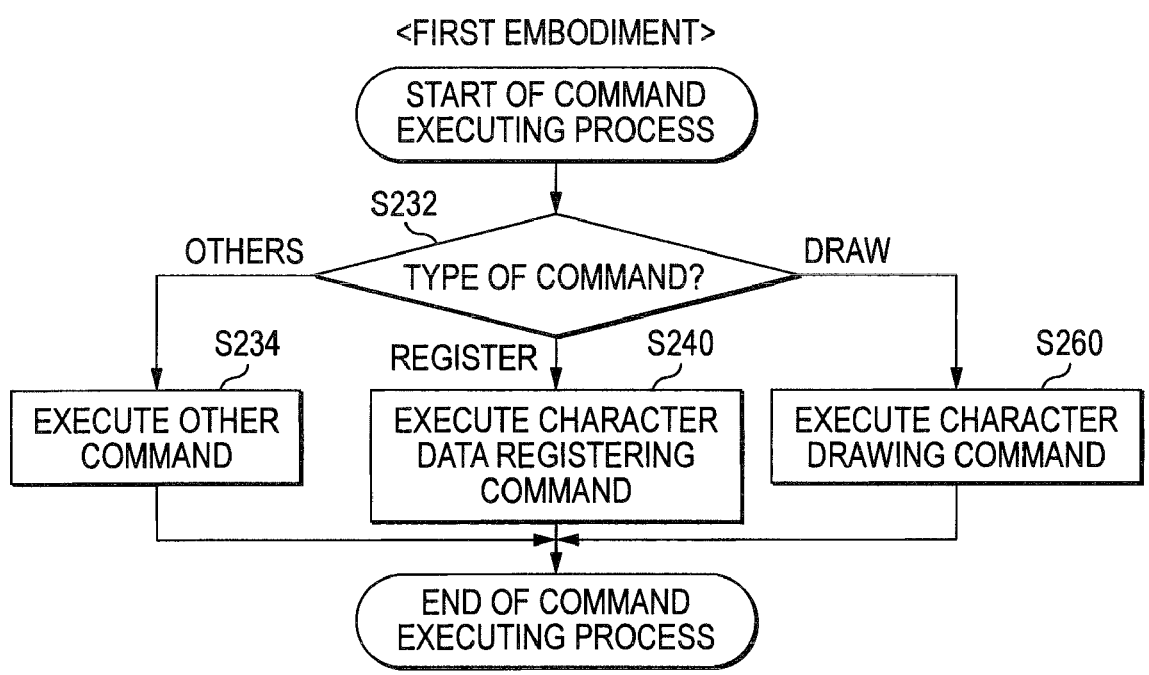
FIG. 5 is a flowchart explaining details of processing procedures in a command executing process of the first embodiment.

FIG. 5 is a flowchart explaining details of processing procedures in the command executing process (S230) of the first embodiment.

In the command executing process (S230), the command type discriminating portion 410 checks what is the type of the command (S232). It is checked whether the type of the command corresponds to a "character data registering command" or a "character drawing command". If the type of the command is other than the "character data registering command" and the "character drawing command", the image processing portion 350A performs the executing process in compliance with "other command" (S232—others, S234).

If the type of the command is the "character data registering command", the character data registering command executing portion 440 performs the executing process in compliance with the "character data registering command" (S232—register, S240).

If the type of the command is the "character drawing command", the character drawing command executing portion 460 performs the executing process in compliance with the "character drawing command" (S232—draw, S260).

Character Data Registering Command Executing Process

First Embodiment

Figure 6:
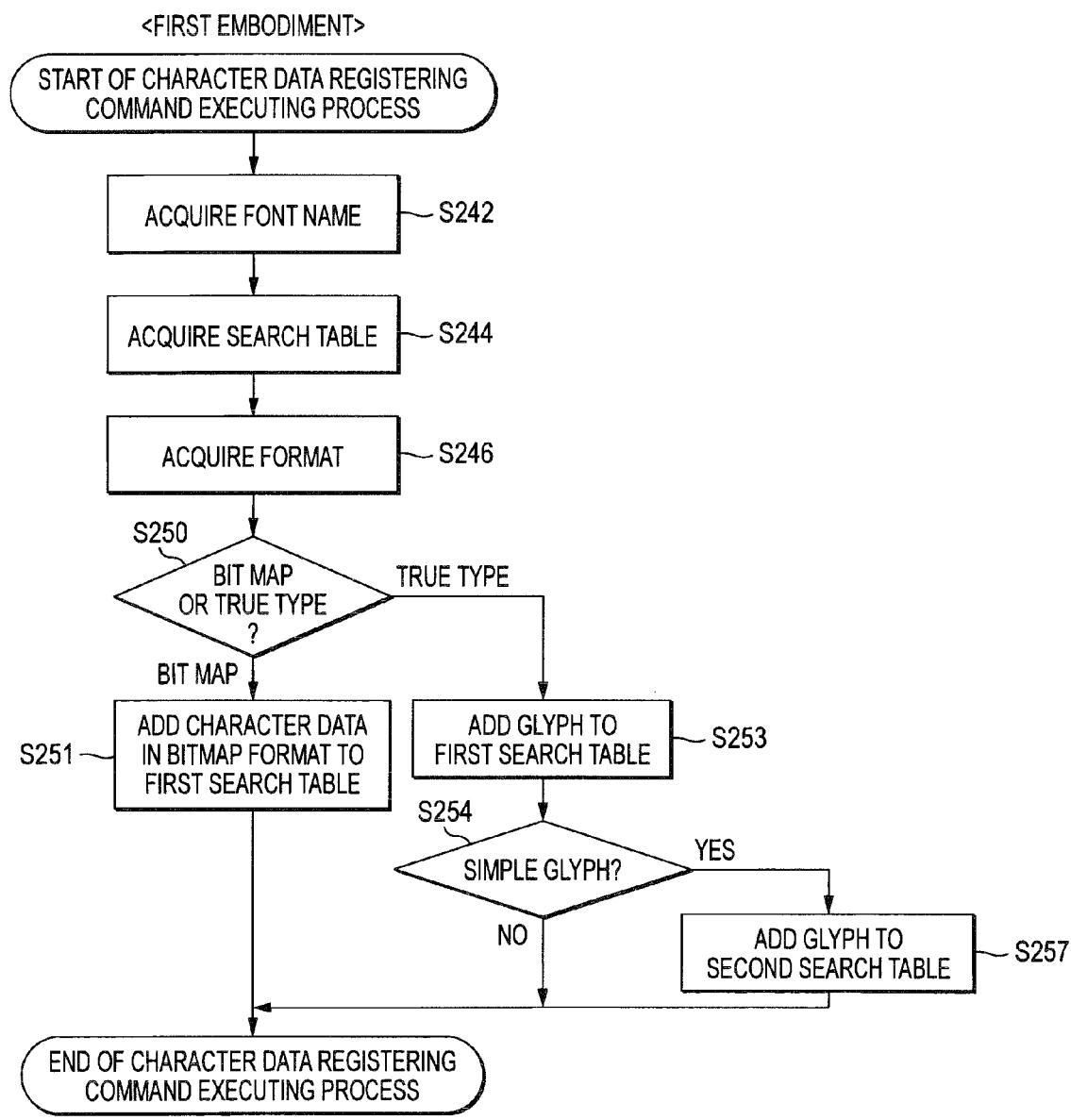
FIG. 6 is a flowchart explaining details of processing procedures in a character data registering command executing process of the first embodiment.

FIG. 6 is a flowchart explaining details of processing procedures in a character data registering command executing process (S240) of the first embodiment.

In the character data registering command executing process (S240), first the font name acquiring portion 442 in the character data registering command executing portion 440 acquires a font name from the font definition command, and then transfers the font name to the registration processing portion 446 (S242).

The registration processing portion 446 acquires the search table that is used to execute the character drawing by using the glyph search when the character command is the glyph (S244). In the present embodiment, the first search table TBL1 and the second search table TBL2 are prepared as the search tables.

The format acquiring portion 444 acquires a format of the font from the character data registering command, and then transfers the format to the registration processing portion 446 (S246).

Here, the format of the font is classified into two fonts, for example, a bitmap font and an outline font. The bitmap font is the font composed of an aggregate of dots, and is also called a "dot font" or a "screen font". The outline font is the font having data of an outline of the character. For example, a "true type font", a "post script font", a "open type font", and the like correspond to the outline font. In the present embodiment, the process is switched in response to either the type of the command is the "bitmap font" or the type of the command is the "true type font" out of the outline font.

The registration processing portion 446 checks whether the character of the registering processing object corresponds to the bitmap font or the true type font (S250). If the character is the bitmap font (S250—Bit Map), the registration processing portion 446 adds (registers) the character data in the bitmap format to the first search table TBL1, and then the character data registering command executing process is ended (S251).

If the character is the true type font (S250—True Type), the registration processing portion 446 adds (registers) the glyph to the first search table TBL1 (S253). In this case, if the character has already been registered, such character is overwritten.

The registration processing portion 446 decides whether or not the glyph is the simple glyph (S254). If the character of the registering processing object is the composite glyph (S254—NO), the registration processing portion 446 ends the character data registering command executing process. If the character of the registering processing object is the simple glyph (S254—YES), the registration processing portion 446 adds the simple glyph to the second search table TBL2 and then ends the character data registering command executing process (S257). In this case, if the character has already been registered, such character is overwritten.

As a result, the composite glyph and the simple glyph are registered mixedly in the first search table TBL1, and only the simple glyph is registered in the second search table TBL2.

[Approach to Discrimination of Simple Glyph and Composite Glyph]

Figure 7:
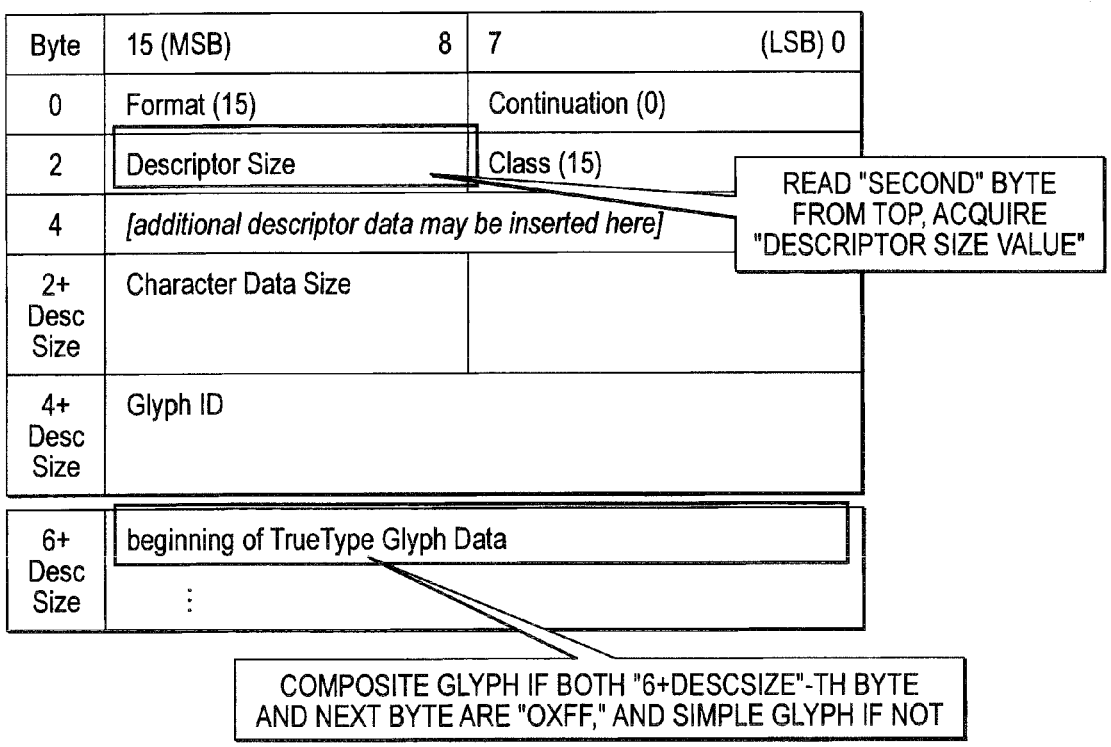
FIG. 7 is a view explaining a process of discriminating a simple glyph and a composite glyph.

FIG. 7 is a view explaining a concrete example of a process of discriminating whether the character of the processing object is the simple glyph or the composite glyph (S254). Here, a method of discriminating the type of the glyph data in "PCL5 Format 15 format" will be explained as an example.

The glyph data is described from the "DescSize"+6-th byte in accordance with the specification of the true type font.

The registration processing portion 446 reads "Descriptor Size value" that is the second byte from the top of the glyph data. This value indicates a layout position, and indicates a start position of the glyph description of the true type font.

The registration processing portion 446 reads the "6+Descriptor Size"-th byte and the "7+Descriptor Size"-th byte. The registration processing portion 446 decides that the character of the processing object is the composite glyph if both of two bytes are "OxFF", and that the character of the processing object is the simple glyph if not.

Character Drawing Command Executing Process

First Embodiment

Figure 8:
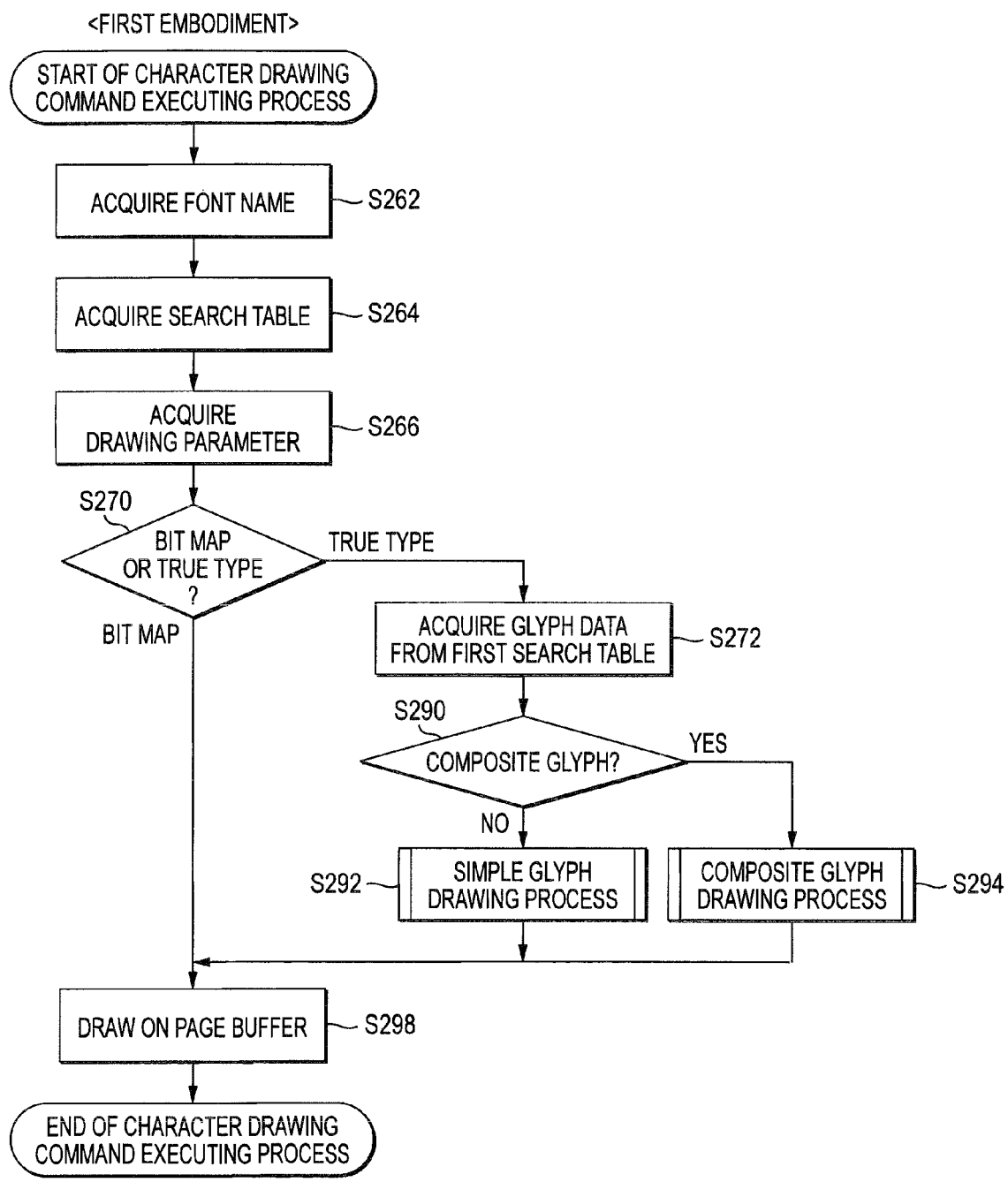
FIG. 8 is a flowchart explaining details of processing procedures in a character drawing command executing process of the first embodiment.

FIG. 8 is a flowchart explaining details of processing procedures in the character drawing command executing process (S260) of the first embodiment In the character drawing command executing process (S260), the font name acquiring portion 462 in the character drawing command executing portion 460 acquires a font name from the font definition command, and transfers the font name to the search processing portion 466 (S262).

Then, the character drawing command executing portion 460 acquires the search table that is used to execute the character drawing by the glyph search when the character command is the glyph (S264). As described above, in the present embodiment, the first search table TBL1 and the second search table TBL2 are prepared.

Then, the parameter acquiring portion 464 acquires the drawing parameter from the character drawing command, and then transfers the drawing parameter to the search processing portion 466 (S266).

The search processing portion 466 checks whether the character of the drawing processing object is the bitmap font or the true type font (S270). If the character is the bitmap font (S270—Bit Map), the search processing portion 466 draws the bitmap data on a page buffer in compliance with the character drawing command (S298), and then ends the character drawing command executing process. The "page buffer" denotes the memory area in which image data produced in respective courses while the document drawing process for one page is executed are stored.

If the character is the true type font (S270—True Type), the search processing portion 466 acquires the data of the glyph, which is the character in the true type font format as the drawing object, from the first search table TBL1 (S272).

The search processing portion 466 decides whether or not the glyph is the composite glyph (S290). If the character of the processing object is the simple glyph (S290—NO), the search processing portion 466 transfers the simple glyph to the simple glyph drawing portion 482. The simple glyph drawing portion 482 executes the drawing development of the simple glyph (S292), and then draws the image data (bitmap data) of the character, which was subjected to the drawing development, on the page buffer (S298). Then, the character drawing command executing process is ended.

If the character of the processing object is the composite glyph (S290—YES), the search processing portion 466 instructs the composite glyph drawing portion 484 to executed the drawing development of the composite glyph. The composite glyph drawing portion 484 executes the composite glyph drawing process (S294), and then draws the image data (bitmap data) of the character, which was subjected to the drawing development, on the page buffer (S298). Then, the character drawing command executing process is ended.

Composite Glyph Character Drawing Process

First Embodiment

Figure 9:
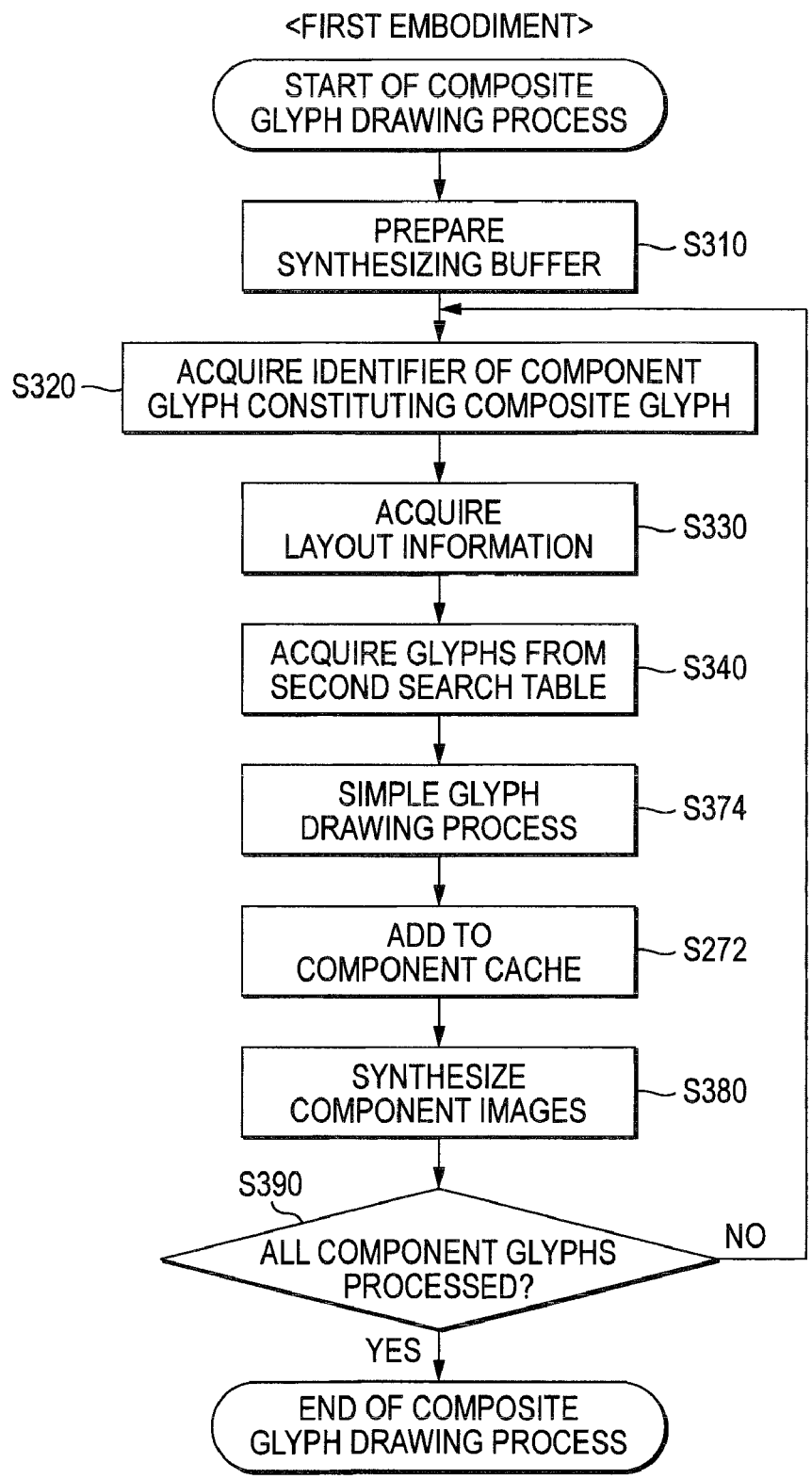
FIG. 9 is a flowchart explaining details of processing procedures in a composite glyph character drawing process of the first embodiment.

FIG. 9 is a flowchart explaining details of processing procedures in the composite glyph character drawing process (S294) of the first embodiment. In this case, the glyph constituting the composite glyph is also referred to as a "component glyph" hereinafter.

In the composite glyph character drawing process (S294) in the first embodiment, first the composite glyph drawing portion 484 prepares a synthesizing buffer (S310). The "synthesizing buffer" denotes a working memory area (working buffer) that is used to synthesize image data of respective component glyphs (in the first embodiment, only the simple glyphs) constituting the composite glyph. When this "synthesizing buffer" is prepared, a memory area having a size that corresponds to a specified character size should be kept.

Then, the identifier acquiring portion 520 in the composite glyph drawing portion 484 acquires identifiers (glyph IDs) of respective simple glyphs constituting the composite glyph, and instructs the search processing portion 466 to search (S320). Then, the layout information acquiring portion 522 acquires layout information of respective simple glyphs as component glyphs constituting the composite glyph (S330). Here, the "layout information" denotes the position information indicating in which positions respective simple glyphs should be pasted to complete the composite glyph.

The search processing portion 466, when received the simple glyph search command, acquires respective simple glyphs as the component glyphs from the second search table TBL 2, and then transfers the simple glyphs to the simple glyph drawing portion 482 (S340). The simple glyph drawing portion 482 produces the image data (bitmap data: component images) of respective simple glyphs by executing the drawing development of the simple glyph, and then transfers the image data to the synthesizing portion 526 (S374). The synthesizing portion 526 synthesizes the component images by drawing the component images of respective simple glyphs, which were subjected to the drawing development by the simple glyph drawing portion 482, in respective corresponding positions of the synthesizing buffer (S380).

Such process is applied to all component glyphs (in the first embodiment, only the simple glyphs) constituting the composite glyph. That is, after the component images of the component glyphs constituting the composite glyph as the processing object are synthesized, the image processing portion 350A checks whether or not remaining component glyphs constituting the composite glyph as the processing object are still present (S390). If remaining component glyphs are present (S390—NO), the process goes back to step S320, and then the next component glyph drawing process is executed. If no remaining component glyph is present (S390—YES), the image processing portion 350A ends the composite glyph character drawing process.

Application Example

First Embodiment

FIG. 10A to FIG. 10D are views explaining the application examples of the first embodiment. In this case, FIG. 10A is a view showing print data used in this application example, FIG. 10B is a view explaining a structure of the composite glyph used in the print data shown in FIG. 10A. FIG. 10C is a view showing an example of registered information of the first search table TBL1 and the second search table TBL2 in this application example. FIG. 10D is a view explaining occupied rates of the composite glyph and the simple glyph in the font data of "HYShortSamul-Medium" used in this application example.

In this case, examples of respective glyphs shown in the application examples are pseudo glyphs (pseudo code) used for the purpose of concrete explanation of the first embodiment, and it is discounted that they are similar to or different from the actual glyphs.

In this application example, the case where the print data (pseudo code) shown in FIG. 10A is drawing-developed will be explained hereunder. The glyphs "Glyph 54596", "Glyph 54736" of the true type font shown in FIG. 10A have a composite structure shown in FIG. 10B. The composite glyph "Glyph 54596" is constructed by three simple glyphs "Glyph 65607", "Glyph 65650", "Glyph 65681". The composite glyph "Glyph 54736" is constructed by two simple glyphs "Glyph 66257", "Glyph 65681".

The print data shown in FIG. 10A is produced by the printer driver of the host side apparatus 2 shown in FIG. 1, and is received by the interface portion 330 of the printing machine 3 via the interface portion 230 and the transmission line 9.

In the printing machine 3, the image processing portion 350A acting as the drawing development processing portion executes the drawing development process every page in accordance with the processing procedures shown in FIG. 4.

At this time, the image processing portion 350A acquires the commands of the print data sequentially (S222). As shown in FIG. 10A, the first command "Define Font HYShortSamul-Medium<HYShortSamul-Medium data>" is the font definition command. Therefore, the image processing portion 350A reads the font definition command, and then goes to the command executing process (S230) shown in FIG. 5.

When the process goes to the command executing process (S230), the type of the command corresponds to "other command". Therefore, the image processing portion 350A executes the appropriate process (font defining process) in response to the font definition command, and then ends the execution of this command (S232—other, S234). The "font defining process" is not peculiar to the present embodiment and is the common process, and thus its detailed explanation will be omitted herein.

The image processing portion 350A reads the next command "Define Glyph 54596<Glyph 54596 (Composite) data>" of the print data shown in FIG. 10A (S222: FIG. 4), and goes to the command executing process (S230) shown in FIG. 5. Since the next command is the definition command of "Glyph 54596", the image processing portion 350A goes to the character data registering command executing process (S240) shown in FIG. 6 to process the "glyph registering command".

When the process goes to the character data registering command executing process (S240), the image processing portion 350A first acquires a font name (S242). In this case, the "HYShortSamul-Medium" defined previously is used as the font name.

The image processing portion 350A further acquires two search tables (the first search table TBL1 and the second search table TBL2) (S244). Respective search tables are empty at this point of time.

The image processing portion 350A acquires a format of the processing object character (S246). In this case, it is understood that the format is the true type font format on account of "Glyph 54596" (S250—True Type). Therefore, the image processing portion 350A registers this "Glyph 54596" on the first search table TBL1 (S253).

Since the true type font is the composable format, the image processing portion 350A decides whether or not "Glyph 54596" is the simple glyph (S254). Since "Glyph 54596" is the composite glyph (S254—NO), the image processing portion 350A ends the execution of the glyph registering command.

The image processing portion 350A reads the next command "Define Glyph 65607<Glyph 65607 (Simple) data>" of the print data shown in FIG. 10A (S222; FIG. 4), and then goes to the command executing process (S230) shown in FIG. 5. Since the next command is the definition command of "Glyph 65607", the image processing portion 350A goes to the character data registering command executing process (S240) shown in FIG. 6 to process the "glyph registering command".

When the process goes to the character data registering command executing process (S240), the image processing portion 350A executes the similar process to the case of "Glyph 54596", and registers "Glyph 65607" on the first search table TBL1 (S253).

Also, the image processing portion 350A decides whether or not "Glyph 65607" is the simple glyph (S254). Since "Glyph 65607" is the simple glyph (S254—YES), the image processing portion 350A registers "Glyph 65607" in the second search table TBL2, and then ends the execution of the glyph registering command (S257).

The image processing portion 350A executes such process sequentially up to all glyph definition commands contained in the print data (up to "Glyph 66257").

At this point of time, as shown in FIG. 10C(1), "Glyph 54596", "Glyph 65607", "Glyph 65650", "Glyph 65681", "Glyph 54736", and "Glyph 66257" are registered in the first search table TBL1. Also, as shown in FIG. 10C(2), "Glyph 65607", "Glyph 65650", "Glyph 65681", and "Glyph 66257" are registered in the second search table TBL2.

The image processing portion 350A reads the next command "Draw (100,100) 10 pt <54596>" of the print data shown in FIG. 10A (S222: FIG. 4), and then goes to the command executing process shown in FIG. 5 (S230) This command corresponds to the command that draws "Glyph 54596" of a 10 pt (point) size in the position of coordinates (100,100). Therefore, the image processing portion 350A goes to the character drawing command executing process (S260) shown in FIG. 8 to process the "character drawing command".

When the process goes to the character drawing command executing process (S260), the image processing portion 350A first acquires a font name (S262). In this case, the "HYShortSamul-Medium" defined previously is used as the font name.

The image processing portion 350A acquires the search table of "HYShortSamul-Medium" (S264). In this case, the image processing portion 350A acquires two types of search tables (the first search table TBL1 and the second search table TBL2) shown in FIG. 10C.

Also, the image processing portion 350A acquires a drawing parameter from the character drawing command (S266). In this case, a font size "10 pt" corresponds to the parameter.

The image processing portion 350A acquires the data of "Glyph 54596" by searching the first search table TBL1 (S272). Since "Glyph 54596" is the composite glyph (S290—YES), the image processing portion 350A executes the composite glyph character drawing process shown in FIG. 9 (S294).

When the process goes to the composite glyph character drawing process (S294), the image processing portion 350A first prepares the synthesizing buffer (S310). Then, the image processing portion 350A acquires sequentially glyph IDs of respective simple glyphs constituting the composite glyph as the processing object and the layout information (S320, S330). Here, the image processing portion 350A first acquires "ID:65607" and the layout information, for example, out of three simple glyphs "Glyph 65607", "Glyph 65650", "Glyph 65681" constituting the composite glyph "Glyph 54596".

The image processing portion 350A acquires the data of the simple glyph "Glyph 65607" by searching the second search table TBL2 (S340). Then, the image processing portion 350A drawing-develops "Glyph 65607" in a specified size, and then pastes the produced image data in the position according to the "layout information" on the synthesizing buffer of "Glyph 54596" (S374, S380).

Also, the image processing portion 350A produces the synthesized image of the composite glyph "Glyph 54596", by executing the similar process of remaining simple glyphs "Glyph 65650", "Glyph 65681" constituting the composite glyph "Glyph 54596". Then, the image processing portion 350A pastes the synthesized image data (synthesized image) of the composite glyph "Glyph 54596", which was synthesized by the synthesizing buffer, in the position of coordinates (100, 100) of the page buffer (S298).

The image processing portion 350A processes the composite glyph "Glyph 54736" similarly to the composite glyph "Glyph 54596". For example, since "Glyph 54736" is constructed by two simple glyphs "Glyph 66257", "Glyph 65681", the image processing portion 350A acquires the data of the simple glyphs "Glyph 66257", "Glyph 65681" by searching the second search table TBL2 (S340). Then, the image processing portion 350A produces the synthesized image of the composite glyph "Glyph 54736", by pasting the produced image data, which are drawing-developed in a specified size respectively, on the positions according to respective "layout information" on the synthesizing buffer of "Glyph 54736" (S374, S380). Then, the image processing portion 350A pastes the synthesized image data (synthesized image) of the composite glyph "Glyph 54736", which is synthesized by the synthesizing buffer, in the position of the coordinates (100, 120) of the page buffer (S298).

With the above, the character drawing process based upon the print data shown in FIG. 10A is ended.

In the application example of the first embodiment, when the character drawing process is executed by the glyph search, two simple glyphs "Glyph 54596" and "Glyph 54576" are searched from the first search table TBL1 in which the composite glyphs and the simple glyphs are registered mixedly (six glyphs are registered), while four simple glyphs "Glyph 65607", "Glyph 65650", "Glyph 65681", and "Glyph 66257" are searched from the second search table TBL2 in which only the simple glyphs are registered (four glyphs are registered). Here, "Glyph 65681" is searched two times.

In contrast, when the first embodiment is not applied, the second search table TBL2 is not provided. Therefore, the character drawing process of four simple glyphs "Glyph 65607", "Glyph 65650", "Glyph 65681", and "Glyph 66257" is executed by the glyph search from the first search table TBL1.

Since only the simple glyphs are registered in the second search table TBL2, the number of registrations in the second search table TBL2 is smaller than the first search table TBL1. Therefore, the searching process is sped up in the first embodiment utilizing the second search table TBL2 rather than the case where only the first search table TBL1 is utilized.

In the application example illustrated herein, a difference in the processing speed does not remarkably appear because the number of characters is small. In the font data of the actual "HYShortSamul-Medium", as shown in FIG. 10D, the simple glyphs are contained in the second search table TBL2 merely by 14% of the overall glyphs. Therefore, a tendency of this occupied rate also appears in the print data, and a size of the second search table TBL2 becomes smaller than the first search table TBL1. For example, it is expected that the second search table TBL2 becomes ⅛ to ½ based on actually measured data. The searching process can be sped up in the first embodiment rather than the approach using only the first search table TBL1 that is the mixed search table. For example, a glyph searching time needed for the drawing process of the composite character such as the Hangul character, or the like can be shortened, and also a drawing processing time can be shortened rather than the case where the first embodiment is not applied.

This advantage can also be understood from such an aspect that, when the concerned simple glyph is searched from not the mixed search table (in the present embodiment, the second search table TBL2), in which the composite glyphs that is not hit by the search constitute the majority of the contained glyphs, but the individual search table (in the present embodiment, the first search table TBL1), in which only the simple glyphs are present, the useless search can be eliminated and also the glyph search can be conducted effectively.

Drawing Developing Process

Second Embodiment (First Example)

The drawing developing process in the second embodiment (first example) will be explained hereunder. The drawing developing process in the second embodiment is characterized in that an example capable of dealing with the case where both the composite glyph having only the simple glyphs as the constituent element and the composite glyph having the composite glyphs as the constituent element are present mixedly as the processing object is given. For example, as the specification of the true type font, such a configuration is allowed that the glyphs constituting the composite glyph are also the composite glyphs. This first example gives the setup that can deal with such case.

In the first embodiment, even when the drawing process is applied to the composite glyph that has the composite glyphs as the constituent element, the concerned composite glyph cannot be acquired by searching the second search table TBL2 in step S340 and thus the drawing development cannot be held.

In order to deal with this situation, in the second embodiment (first example), like the first embodiment, the first search table TBL1 in which the composite glyph and the simple glyph are registered mixedly and the second search table TBL2 in which only the simple glyph is registered are prepared in the glyph registering process. Also, in the drawing process of the constituent elements (either the simple glyph or the composite glyph) of the composite glyph, when the concerned glyph cannot be acquired after the second search table TBL2 is searched (i.e., the constituent elements of the composite glyph are the composite glyphs), the first search table TBL1 is also searched.

In the second embodiment (first example) the composite glyph character drawing process is different from the first embodiment, but remaining points are similar to the first embodiment. Mainly differences from the first embodiment will be explained concretely hereunder. In this case, a configuration of an image processing portion 350B in the second embodiment (first example) is similar to the image processing portion 350A in the first embodiment. Here, its illustration is omitted herein.

Composite Glyph Character Drawing Process

Second Embodiment (First Example)

Figure 11:
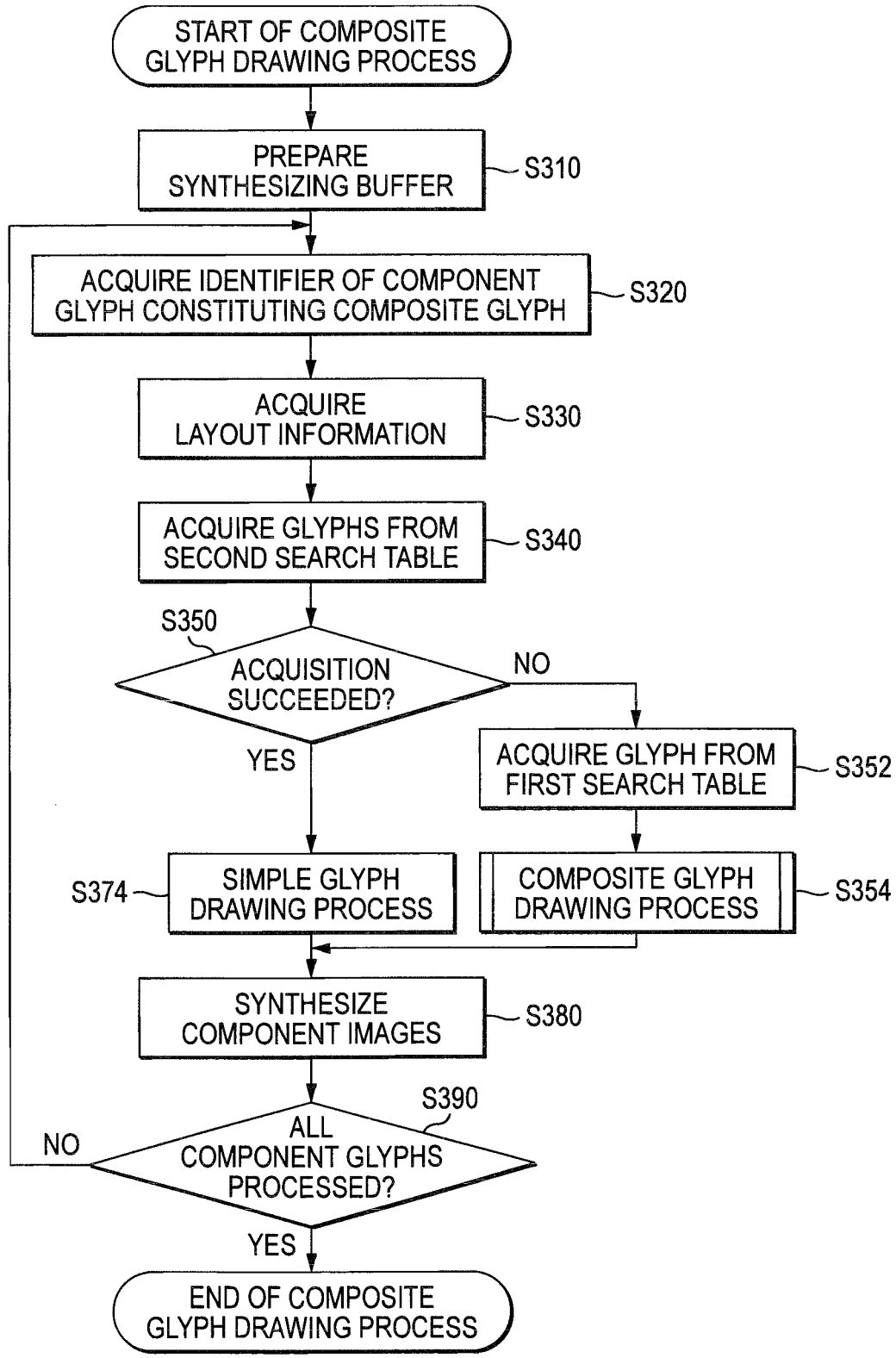
FIG. 11 is a flowchart explaining details of processing procedures in a composite glyph character drawing process of a second exemplary embodiment (first example) of the present invention.

FIG. 11 is a flowchart explaining details of processing procedures in the composite glyph character drawing process (S294) of the second embodiment (first example) of the present invention. Here, the step numbers similar to those in the first embodiment are affixed to process steps similar to those in the first embodiment.

In the composite glyph character drawing process (S294) of the second embodiment (first example), the processes executed up to step S340 are similar to those in the first embodiment.

If the search processing portion 466 succeeded an acquisition of respective glyphs (either the simple glyphs or the composite glyphs) constituting the composite glyph from the second search table TBL2 (S350—YES), it transfers the glyphs to the simple glyph drawing portion 482. The simple glyph drawing portion 482 produces the component images of respective simple glyphs by executing the simple glyph character drawing process, like the first embodiment (S374).

If the search processing portion 466 failed the acquisition of respective glyphs constituting the composite glyph from the second search table TBL2 (S350—NO), it acquires the glyphs from the first search table TBL1 (S352). Here, an explanation is continued for the time being on the assumption that the composite glyphs constituting the composite glyph can be acquired from the first search table TBL1. The search processing portion 466 transfers the glyphs to the composite glyph drawing portion 484. The composite glyph drawing portion 484 produces the component images of respective composite glyphs constituting the composite glyph, by executing the composite glyph character drawing process in the second embodiment (second example) (S354).

The synthesizing portion 526 of the composite glyph drawing portion 484 synthesizes the component images, by drawing the image data of respective simple glyphs, to which the simple glyph drawing portion 482 applies the drawing development, in corresponding positions of the synthesizing buffer respectively (S380).

In the composite glyph character drawing process in step S354, if the component glyph has further the component glyphs as the constituent elements, the processes in steps subsequent to step S350—NO are repeated. Therefore, the drawing process can be applied correctly to the font whose composite structure is built up (nested) into N stages (N is a positive integer in excess of 2).

Application Example

Second Embodiment (First Example)

Figure 12B:
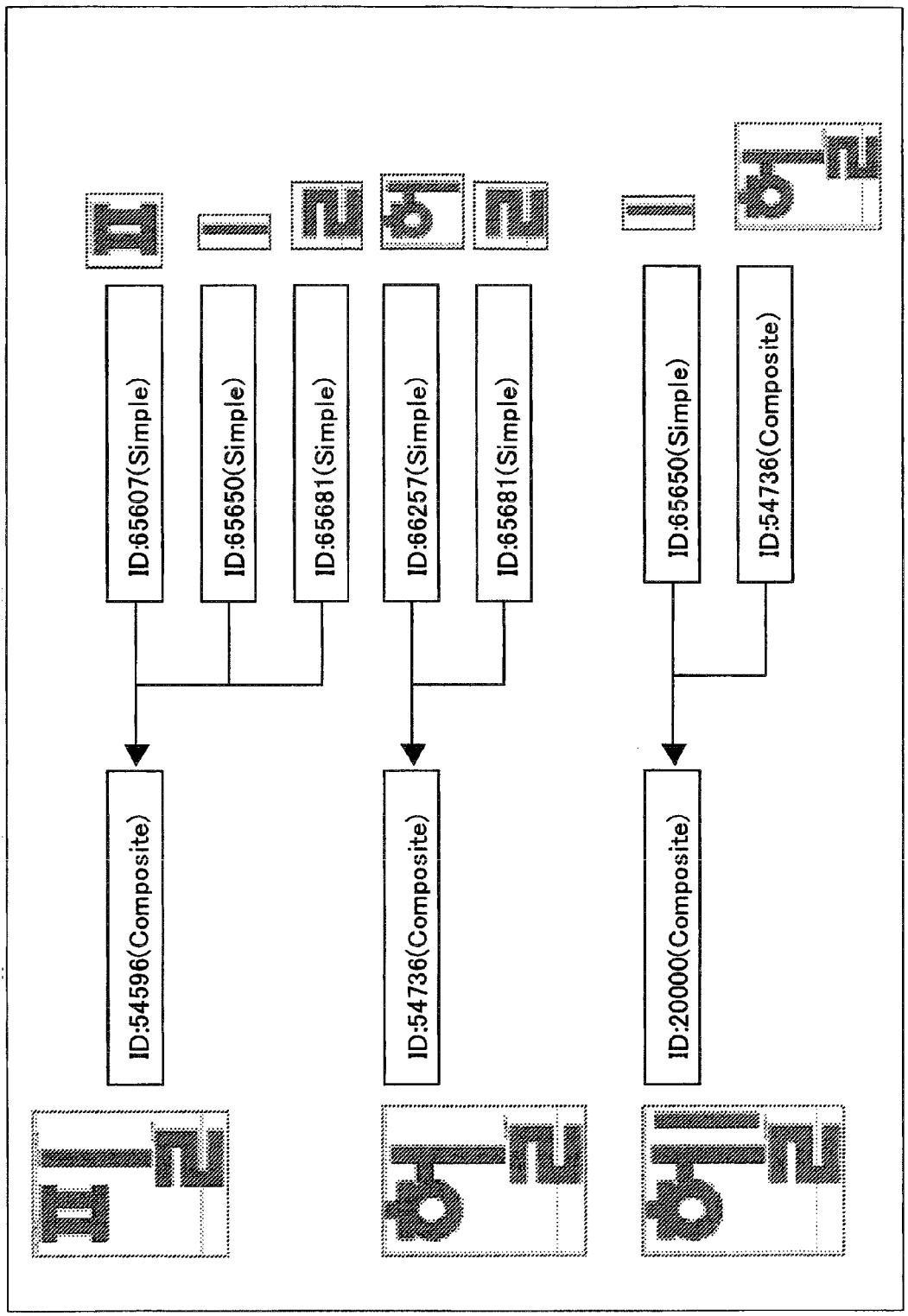
FIG. 12B is a view explaining a structure of the composite glyph used in print data shown in FIG. 12A.

FIG. 12A to FIG. 12C are views explaining application examples of the second embodiment (first example). Here, FIG. 12A is a view showing the print data used in this application example. FIG. 12B is a view explaining a structure of the composite glyph used in print data shown in FIG. 12A. FIG. 12C is a view showing an example of the registered information in the first search table TBL1 and the second search table TBL2 in this application example. In this case, examples of respective glyphs shown in the application examples are pseudo glyphs (pseudo code) used for the purpose of concrete explanation of the second embodiment (first example), and it is discounted that they are similar to or different from the actual glyphs.

The application example of the second embodiment (first example) corresponds to the case where respective composite glyphs having the simple glyph and the composite glyph as the constituent elements are present mixedly among the composite glyphs as the processing object.

For example, as shown in FIG. 12A, the print data applied herein is different from the print data in the application example of the first embodiment shown in FIG. 10A in that "Define Glyph 20000<Glyph 20000 (Composite) data>" is added after "Define Glyph 66257<Glyph 66257 (Simple) data>", and the corresponding character drawing command "Draw (100,120) 10 pt<20000>" is present. This "Define Glyph 20000<Glyph 20000 (Composite) data>" is the definition command of "Glyph 20000". As shown in FIG. 12B, this "Glyph 20000" is different from the first embodiment in that this "Glyph 20000" has not only the composite glyphs but also the composite glyph "Glyph 54736" as the constituent elements. In this regard, this "Glyph 20000" is not the actual one, but this glyph satisfies the specification of the true type font and is set for the purpose of explanation.

In order to process correctly this glyph, in the second embodiment (first example), as described above, the composite glyph character drawing process is set differently from the first embodiment.

The print data shown in FIG. 12A is produced by the printer driver of the host side apparatus 2 shown in FIG. 1, and is received by the interface portion 330 of the printing machine 3 via the interface portion 230 and the transmission line 9.

In the printing machine 3, the image processing portion 350B acting as the drawing development processing portion executes the drawing development process every page in accordance with the processing procedures shown in FIG. 4.

Like the first embodiment, the processes are executed sequentially up to the definition command (up to "Glyph 20000") of all glyphs contained in the print data.

At this point of time, as shown in FIG. 12C(1), "Glyph 54596", "Glyph 65607", "Glyph 65650", "Glyph 65681", "Glyph 54736", "Glyph 66257", "Glyph 20000" are registered in the first search table TBL1. Also, as shown in FIG. 12C(2), "Glyph 65607", "Glyph 65650", "Glyph 65681", "Glyph 66257" are registered in the second search table TBL2.

The image processing portion 3501B reads the next command "Draw (100,100) 10 pt <54596>" of the print data shown in FIG. 12A (S222: FIG. 4), and goes to the command executing process shown in FIG. 5 (S230). Since this command corresponds to the command that draws "Glyph 54596" in the position of coordinates (100,100) in a size of 10 pt, the image processing portion 350B goes to the character drawing command executing process (S260) shown in FIG. 8 to process the "character drawing command".

The image processing portion 350B acquires the data of "Glyph 54596" by searching the first search table TBL1 (S272). Because "Glyph 54596" is the composite glyph (S290—YES), the image processing portion 350B executes the composite glyph character drawing process shown in FIG. 11 (S294).

When the process goes to the composite glyph character drawing process (S294), the image processing portion 35013 first prepares the synthesizing buffer (S310), and then acquires sequentially the glyph IDs of respective glyphs constituting the composite glyph as the processing object and the layout information (S320, S330). Here, out of three simple glyphs "Glyph 65607", "Glyph 65650", "Glyph 65681" constituting the composite glyph "Glyph 54596", for example, "ID: 65607" and the layout information are acquired at first.

The image processing portion 350B acquires the data of the simple glyph "Glyph 65607" by searching the second search table TBL2 (S340, S350—YES). Then, the image processing portion 350B drawing-develops "Glyph 65607" in a specified size, and pastes the produced image data in the position according to "layout information" on the synthesizing buffer of "Glyph 54596" (S374, S380).

Also, the image processing portion 350B executes similarly the process of the remaining glyphs "Glyph 65650", "Glyph 65681" constituting the composite glyph "Glyph 54596". Since all remaining glyphs are the simple glyphs, the image processing portion 350B produces the synthesized image of the composite glyph "Glyph 54596" by searching the second search table TBL2. Then, the image processing portion 350B pastes the synthesized image data (synthesized image) of the composite glyph "Glyph 54596", which was synthesized by the synthesizing buffer, in the position of the coordinates (100,100) of the page buffer (S298).

The image processing portion 350B reads the next command "Draw (100,120) 10 pt <20000>" (S222: FIG. 4), and goes to the command executing process shown in FIG. 5 (S230). This command corresponds to the command that draws "Glyph 20000" in the position of the coordinates (100, 120) in a size of 10 pt.

The image processing portion 350B acquires the data of "Glyph 20000" by searching the first search table TBL1 (S272). Since "Glyph 20000" is the composite glyph (S290—YES), the image processing portion 350B executes the composite glyph character drawing process shown in FIG. 11 (S294).

When the process goes to the composite glyph character drawing process (S294), the image processing portion 350B first prepares the synthesizing buffer (S310), and then acquires sequentially the glyph IDs of the glyphs constituting the composite glyph as the processing object and the layout information (S320, S330). Here, out of the simple glyph "Glyph 65650" and the composite glyph "Glyph 54736" constituting the composite glyph "Glyph 20000", for example, "ID: 65650" and the layout information are acquired at first.

The image processing portion 350B tries to acquire the simple glyph "Glyph 65650" by searching the second search table TBL2 (S340). Since the acquisition is succeeded because this glyph is the simple glyph (S350—YES), the image processing portion 350B drawing-develops "Glyph 65650" in a specified size, and pastes the produced image data in the position according to the "layout information" on the synthesizing buffer of "Glyph 20000" (S374, S380).

Then, the image processing portion 350B acquires the remaining "ID: 54736" and the layout information. The image processing portion 350B tries to acquire the glyph "Glyph 54736" by searching the second search table TBL2 (S340). Since the glyph "Glyph 54736" is not registered in the second search table TBL2 yet (S350—NO), this acquisition failed. Therefore, the image processing portion 350B tries to acquire the glyph "Glyph 54736" by searching the first search table TBL1 (S352). Since the glyph "Glyph 54736" is registered in the first search table TBL1 this acquisition succeeded.

The image processing portion 350B produces the component images of respective composite glyphs constituting the composite glyph "Glyph 54736" by executing the composite glyph character drawing process in the second embodiment (first example), and then obtains the synthesized image of "Glyph 54736" by synthesizing the component images (S354). The image processing portion 350B pastes the synthesized image of the composite glyph "Glyph 54736" in the position according to the "layout information" on the synthesizing buffer of "Glyph 20000" (S380). Accordingly, the synthesized image of the composite glyph "Glyph 20000" can be obtained.

Then, the image processing portion 350B pastes the synthesized image data (synthesized image) of the composite glyph "Glyph 54136", which was synthesized by the synthesizing buffer, in the position of the coordinates (100,120) of the page buffer (S298). With the above, the character drawing process based upon the print data shown in FIG. 12A is completed.

Drawing Developing Process

Second Embodiment (Second Example)

The drawing developing process of the second embodiment (second example) will be explained hereunder. The second embodiment (second example) is characterized based on the second embodiment (first example) in that, when the concerned composite glyph is not found in the second search table TBL2 but the concerned composite glyph can be acquired from the first search table TBL1 in a situation that the constituent elements of the composite glyph are formed of the composite glyphs, the composite glyph is drawing-developed and then the developed composite glyph is added (registered) in the second search table TBL2.

In the second embodiment (second example), the composite glyph character drawing process is different from the second embodiment (first example), and other points are similar to the second embodiment (first example). Mainly differences from the second embodiment (first example) will be explained concretely hereunder.

[Apparatus Configuration]

Figure 13:
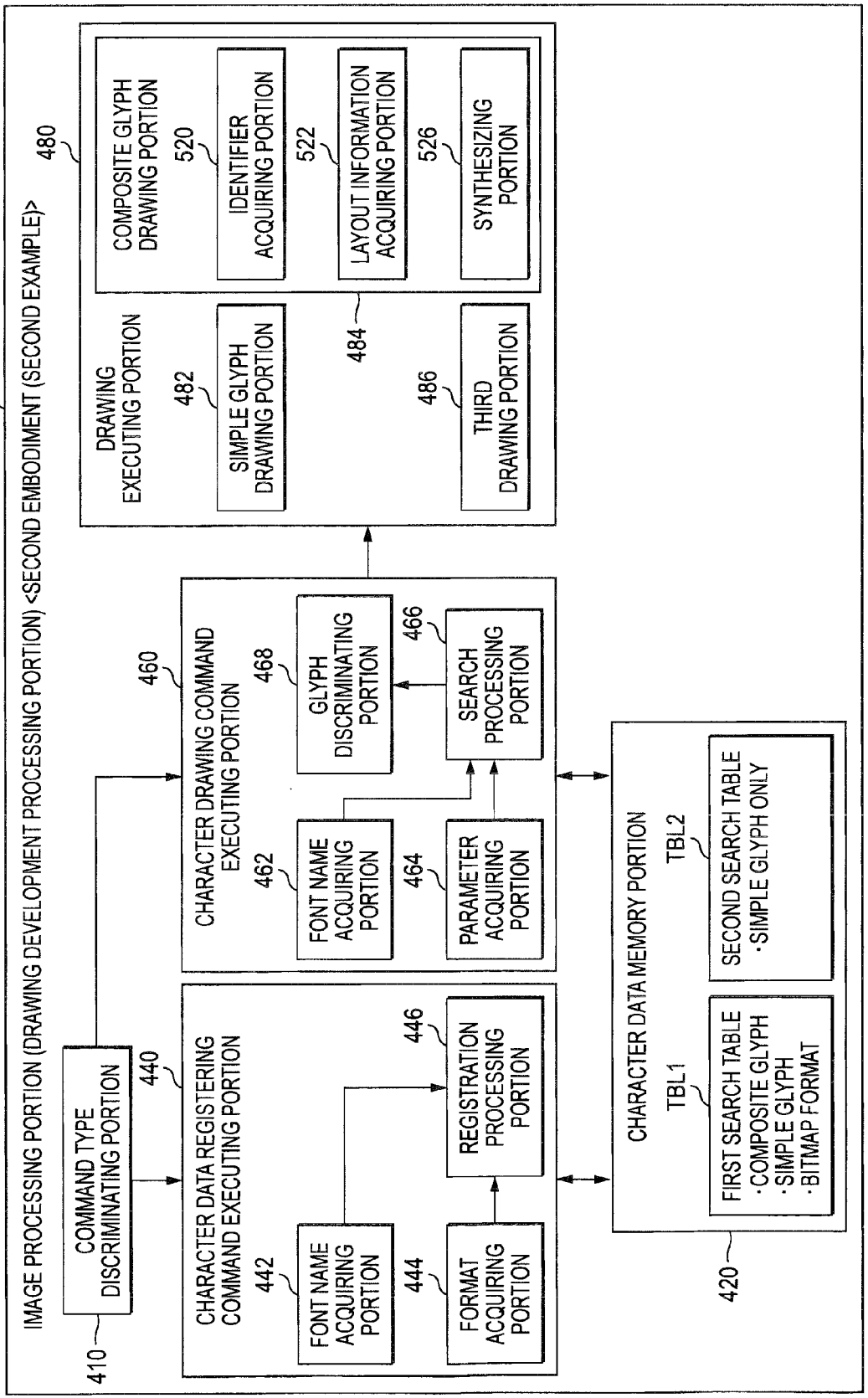
FIG. 13 is a diagram showing an image processing portion of the second embodiment (second example)

FIG. 13 is a diagram showing an image processing portion 350C of the second exemplary embodiment (second example). The image processing portion 350C of the second embodiment (second example) is constructed based on the image processing portion 350A in the first example, and is different in that the character drawing command executing portion 460 has a glyph discriminating portion 468.

The glyph discriminating portion 468 discriminates whether the glyph that the search processing portion 466 acquired from the second search table TBL2 is the simple glyph or the composite glyph. In response to the discriminated result, the glyph discriminating portion 468 switched the transferred destination of the glyph that the search processing portion 466 acquired (either the simple glyph drawing portion 482 or the composite glyph drawing portion 484).

Composite Glyph Character Drawing Process

Second Embodiment (Second Example)

FIG. 14 is a flowchart explaining details of processing procedures in the composite glyph character drawing process (S294) of the second embodiment (second example). Here, the step numbers similar to those in the first embodiment are affixed to process steps similar to those in the first embodiment.

In the composite glyph character drawing process (S294) in the second embodiment (second example), the processes executed up to step S350 are similar to those in the second embodiment (first example).

If the search processing portion 466 succeeded the acquisition of respective glyphs (either the simple glyph or the composite glyph) constituting the composite glyph from the second search table TBL2 (S350—YES), the glyph discriminating portion 468 checks whether or not the glyphs are the simple glyphs (S360). If the glyphs are the simple glyphs (S360—YES), the glyph discriminating portion 468 transfers the glyphs to the simple glyph drawing portion 482. The simple glyph drawing portion 482 produces the component images of respective simple glyphs by executing the simple glyph character drawing process, like the first embodiment (S374).

If the glyphs are not the simple glyphs (i.e., the composite glyphs)(S360—NO), the glyph discriminating portion 468 transfers the glyphs to the composite glyph drawing portion 484. The composite glyph drawing portion 484 goes to the process of producing the component images of respective composite glyphs constituting the composite glyph, by executing the composite glyph character drawing process of the composite glyph in the second embodiment (second example)(S364).

If the search processing portion 466 failed the acquisition of the glyphs constituting the composite glyph from the second search table TBL2 (S350—NO), such search processing portion 466 acquires the glyphs from the first search table TBL1 (S352). Here, an explanation is continued for the time being on the assumption that the composite glyphs constituting the composite glyph can be acquired from the first search table TBL1.

The search processing portion 466 transfers the glyphs to the composite glyph drawing portion 484. The composite glyph drawing portion 484 goes to the process of producing the component images of respective composite glyphs constituting the composite glyph, by executing the composite glyph character drawing process of the composite glyph in the second embodiment (second example)(S354). After the composite glyph is drawing-developed by the composite glyph drawing portion 484, the registration processing portion 446 registers the glyphs to the second search table TBL2 (S356).

The drawing executing portion 480 synthesizes the component images by drawing the image data of the simple glyphs, which were drawing-developed, in the corresponding positions of the synthesizing buffer respectively (S380).

In the second embodiment (second example), the character drawing process of the composite glyphs constituting the composite glyph are executed, and then the composite glyphs are registered in the second search table TBL2 (S356). Therefore, when the same composite glyph character drawing process is needed thereafter, the glyphs are acquired not from the first search table TBL1 but from the second search table TBL2 in which the number of registered glyphs is small (S340, S350—YES). As a result, a searching efficiency in the second embodiment (second example) can be improved rather than that in the second embodiment (first example). A glyph search time can be shortened rather than the first example, and a drawing process time can be further shortened.

Application Example

Second Embodiment (Second Example)

FIG. 15 to FIG. 15A are views explaining application examples of the second embodiment (second example). Here, FIG. 15 is a view showing the print data used in this application example. FIG. 15A is a view showing an example of registered information of the first search table TBL1 and the second search table TBL2 in this application example. In this case, examples of respective glyphs shown in the application examples are pseudo glyphs (pseudo code) used for the purpose of concrete explanation of the second embodiment (second example), and it is discounted that they are similar to or different from the actual glyphs.

As shown in FIG. 15, the print data applied herein is different from the print data in the application example of the second embodiment (first example) shown in FIG. 12 in that a plurality of character drawing commands are provided to "Glyph 20000" as a variation.

In the composite glyph character drawing process (S294) in the first command "Draw (100,120) 10 pt <20000>", the image processing portion 350C adds the composite glyph "Glyph 54736" constituting the composite glyph "Glyph 20000" to the second search table TBL2 (S356). Accordingly, as shown in FIG. 15A(3), "Glyph 65607", "Glyph 65650", "Glyph 65681", "Glyph 66257", "Glyph 54736" are registered in the second search table TBL2.

Therefore, when the composite glyph "Glyph 54736" constituting the composite glyph "Glyph 20000" is drawn in the composite glyph character drawing process (S294) in the second command "Draw (100,180) 10 pt <20000>", the image processing portion 350C acquires the data of the composite glyph "Glyph 54736" from the second search table TBL2. Therefore, it is not needed that the acquisition from the first search table TBL1 that contains a large number of registrations should be executed in steps subsequent to step S350—NO, and a searching effect can be improved.

Application Example

Second Embodiment (Third Example)

Figure 16B:
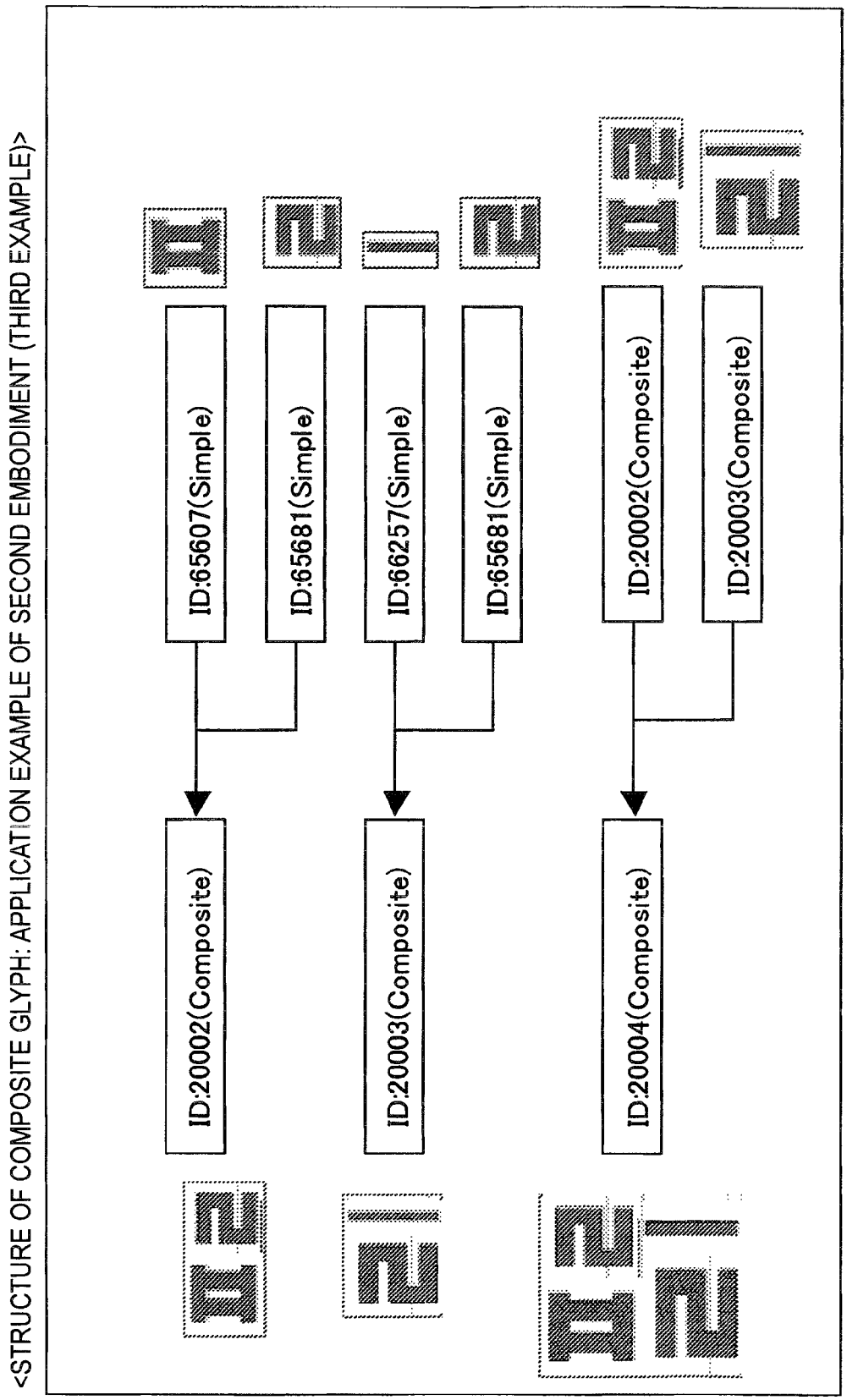
FIG. 16B is a view explaining a structure of the composite glyph used in print data shown in FIG. 16A.

FIG. 16A to FIG. 16C are views explaining application examples of the second embodiment (third example). Here, FIG. 16A is a view showing the print data used in this application example. FIG. 16B is a view explaining a structure of the composite glyph used in the print data shown in FIG. 16A. FIG. 16C is a view showing an example of registered information of the first search table TBL1 and the second search table TBL2 in this application example. In this case, examples of respective glyphs shown in the application examples are pseudo glyphs (pseudo code) used for the purpose of concrete explanation of the second embodiment (second example), and it is discounted that they are similar to or different from the actual glyphs.

The application example of the second embodiment (third example) shows the case where the composite glyphs having a plurality of composite glyphs as the constituent elements (typically, two composite glyphs as the constituent elements) are present mixedly in the composite glyphs as the processing object. In this case, the case where the composite glyph character drawing process in the second embodiment (second example) shown in FIG. 14 is applied will be explained hereunder. Although not shown, the composite glyph character drawing process in the second embodiment (first example) shown in FIG. 11 may be applied.

In this application example, explanation will be made by reference to the case where the print data (pseudo code) shown in FIG. 16A is drawing-developed. The glyphs "Glyph 20002", "Glyph 20003", "Glyph 20004" of the true type font in FIG. 16A have a composite structure shown in FIG. 16B. The composite glyph "Glyph 20002" is constructed by a combination of two simple glyphs "Glyph 65607" and "Glyph 65681". The composite glyph "Glyph 20003" is constructed by a combination of two simple glyphs "Glyph 66257" and "Glyph 65681". The composite glyph "Glyph 20004" is constructed by a combination of two simple glyphs "Glyph 20002" and "Glyph 20003".

The print data shown in FIG. 16A is produced by the printer driver of the host side apparatus 2 shown in FIG. 1, and is received by the interface portion 330 of the printing machine 3 via the interface portion 230 and the transmission line 9.

In the printing machine 3, the image processing portion 350C acting as the drawing development processing portion executes the drawing development process every page in accordance with the processing procedures shown in FIG. 4.

Like the second embodiment (second example), the processes are executed sequentially up to the definition command (up to "Glyph 20004") of all glyphs contained in the print data.

At this point of time, as shown in FIG. 16C(1), "Glyph 65607", "Glyph 65681", "Glyph 20003", "Glyph 66257", "Glyph 20003", "Glyph 20004" are registered in the first search table TBL1. Also, as shown in FIG. 16C(2), "Glyph 65607", "Glyph 65681", "Glyph 66257" are registered in the second search table TBL2.

The image processing portion 350C reads the next command "Draw (100, 120) 10 pt <20004>" of the print data shown in FIG. 16A (S222: FIG. 4), and goes to the command executing process shown in FIG. 5 (S230). Since this command corresponds to the command that draws "Glyph 20004" in the position of the coordinates (100, 120) in a size of 10 pt, the image processing portion 350C goes to the character drawing command executing process shown in FIG. 8 (S260) to process the "character drawing command".

the image processing portion 350C acquires the data of "Glyph 20004" by searching the first search table TBL1 (S272). Since "Glyph 20004" is the composite glyph (S290—YES), the image processing portion 350C executes the composite glyph character drawing process shown in FIG. 14 (S294).

When the process goes to the composite glyph character drawing process (S294), the image processing portion 350C first prepares the synthesizing buffer (S310), and acquires the glyph IDs of respective glyphs constituting the composite glyph as the processing object and the layout information (S320, S330). Here, the image processing portion 350C acquires first "ID: 20002" and the layout information, for example, out of two composite glyphs "Glyph 20002", "Glyph 20003" constituting the composite glyph "Glyph 20004". Such information can be obtained that "Glyph 20002" is arranged at the upper left corner of "Glyph 20004".

The image processing portion 350C tries to acquire the glyph "Glyph 20002" by searching the second search table TBL2 (S340). At this point of time, the glyph "Glyph 20002" is not registered in the second search table TBL2 yet, and the image processing portion 350C failed the acquisition (S350—NO). Therefore, the image processing portion 350C tries to acquire the glyph "Glyph 20002" by searching the first search table TBL1 (S352). Since the glyph "Glyph 20002" is registered in the first search table TBL1, the image processing portion 350C succeeded the acquisition.

The image processing portion 350C produces the component images of respective simple glyphs constituting the composite glyph "Glyph 20002" by executing the composite glyph character drawing process in the second embodiment (second example), and then the synthesized image of "Glyph 20002" by synthesizing the component images (S354). Then, the image processing portion 350C adds the composite glyph "Glyph 20002" constituting the composite glyph "Glyph 20004" to the second search table TBL2 (S356). Then, the image processing portion 350C pastes the synthesized image of the composite glyph "Glyph 20002" in the position according to the "layout information" on the synthesizing buffer of "Glyph 20004" (S380).

Then, the image processing portion 350C acquires the remaining "ID: 20003" and the layout information. Such information can be obtained that "Glyph 20003" is arranged under "Glyph 20002".

The image processing portion 350C tries to acquire the glyph "Glyph 20003" by searching the second search table TBL2 (S340). At this point of time, the glyph "Glyph 20003" is not registered in the second search table TBL2 yet, and the image processing portion 350C failed the acquisition (S350—NO). Therefore, the image processing portion 350C tries to acquire the glyph "Glyph 20003" by searching the first search table TBL1 (S352). Since the glyph "Glyph 20003" is registered in the first search table TBL1, the image processing portion 350C succeeded the acquisition.

The image processing portion 350C produces the component images of respective simple glyphs constituting the composite glyph "Glyph 20003" by executing the composite glyph character drawing process in the second embodiment (second example), and then the synthesized image of "Glyph 20003" by synthesizing the component images (S354). Then, the image processing portion 350C adds the composite glyph "Glyph 20003" constituting the composite glyph "Glyph 20004" to the second search table TBL2 (S356). Then, the image processing portion 350C pastes the synthesized image of the composite glyph "Glyph 20003" in the position according to the "layout information" on the synthesizing buffer of "Glyph 20004" (S380). Accordingly, the synthesized image of the composite glyph "Glyph 20000" can be obtained.

Then, the image processing portion 350C pastes the synthesized image data (synthesized image) of the composite glyph "Glyph 20004", which is synthesized by the synthesizing buffer, in the position of the coordinates (100,120) of the page buffer (S298). With the above, the character drawing process based upon the print data shown in FIG. 16A is completed.

As shown in FIG. 16C(3), "Glyph 65607", "Glyph 65681", "Glyph 66257", "Glyph 20002", "Glyph 20003" are registered in the second search table TBL2. Therefore, in the character drawing process of the same composite glyphs "Glyph 20002" and "Glyph 20003" executed later, the image processing portion 350C acquires the data of these composite glyphs "Glyph 20002" and "Glyph 20003" from the second search table TBL2. Therefore, it is not needed that the acquisition from the first search table TBL1 that contains a large number of registrations should be executed in steps subsequent to step S350—NO, and a searching effect can be improved.

Drawing Developing Process

Third Embodiment

The drawing developing process in the third embodiment will be explained hereunder. The drawing developing process in the third embodiment is characterized in that the setups in the first and second embodiments are used together with the character drawing process utilizing the cache search. The character drawing process is executed at a high speed by applying the cache search when a cache function is effectively performed whereas the first embodiment or the second embodiment is applied when the cache function is not effective, whereby the higher-speed character drawing process can be implemented as a whole. As the typical example, this drawing developing process will be explained by reference to a combination of the cache search and the first embodiment hereunder.

[Apparatus Configuration]

Figure 17:
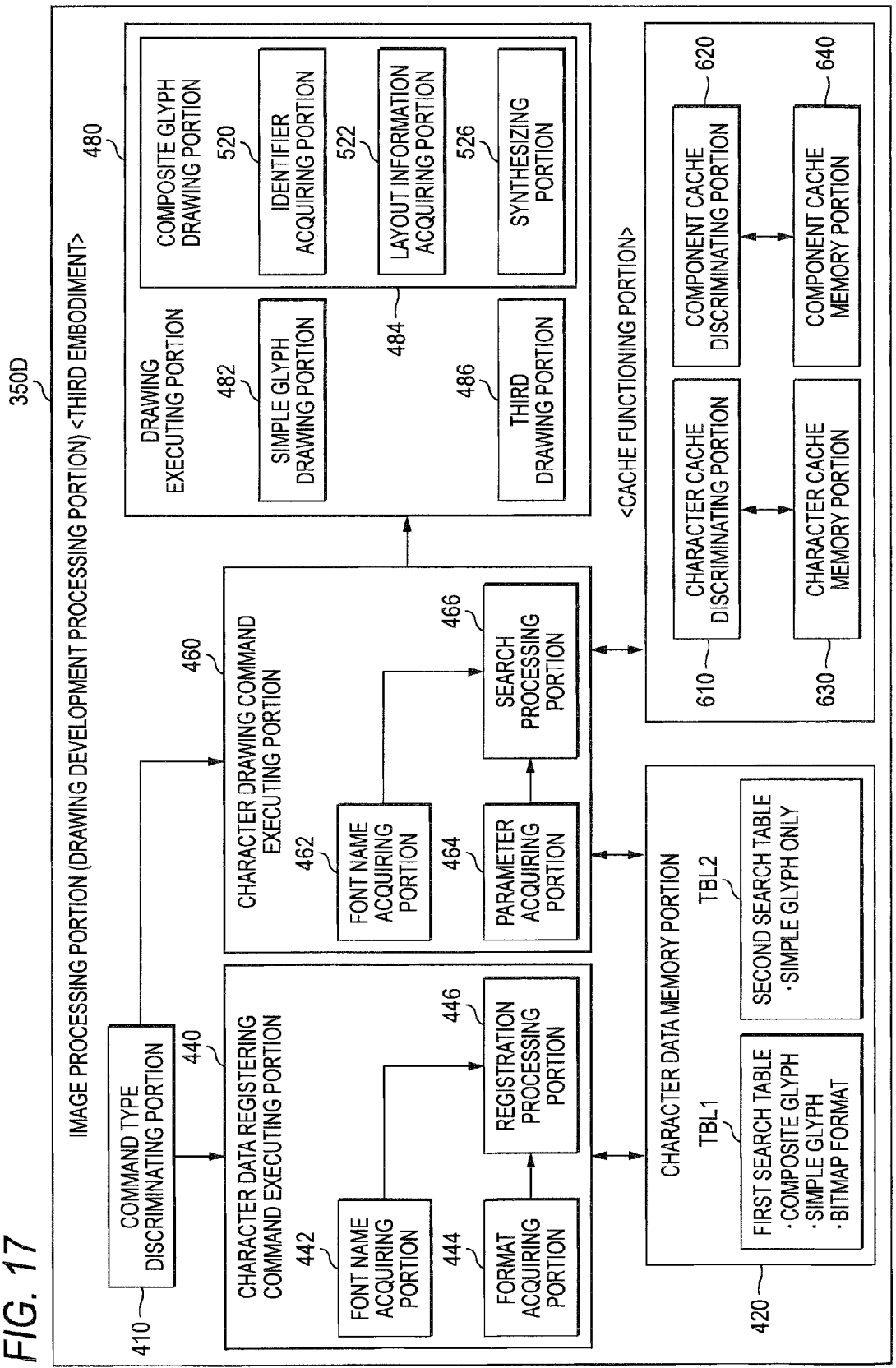
FIG. 17 is a diagram showing an image processing portion of a third exemplary embodiment of the present invention.

FIG. 17 is a diagram showing an image processing portion 350D of a third exemplary embodiment. The image processing portion 350D in the third embodiment has function portions for the cache function, on the basis of the image processing portion 350A in the first embodiment. Here, explanation will be given on the assumption that the memory areas for the cache data are also contained in the image processing portion 350D, but such configuration is not essential. Normally, the hard disc drive 380 and the RAM 312 are utilized as the memory areas, as described above.

The function portions for the cache function are roughly classified into a cache data processing portion for processing the data for the cache process, and a cache memory portion for storing the cache data.

The image processing portion 350D has a character cache discriminating portion 610 and a component cache discriminating portion 620 as a cache data processing portion. Also, the image processing portion 350D has a character cache memory portion 630 and a component cache memory portion 640 as a cache memory portion.

When the input character is the simple glyph, the character cache discriminating portion 610 checks whether or not the character corresponds to the glyph that should be registered in the character cache memory portion 630, and checks whether or not the glyph has already been registered in the character cache memory portion 630.

When the input glyph is the composite glyph, the component cache discriminating portion 620 checks whether or not the glyphs constituting the composite glyph are the glyphs that are should be registered in the component cache memory portion 640, and checks whether or not the glyphs have already been registered in the component cache memory portion 640.

While using the cooperation process between the function portions for these cache functions and the image processing portion 350A in the first embodiment, the image processing portion 350D produces the bitmap data of the character from the font data of the character, or produces the bitmap data of the glyphs constituting the character.

The character cache memory portion 630 stores the bitmap data and the cache register information of respective glyphs. In the present embodiment, the cache register information contains at least a font name, an identifier (ID) used to specify the glyph, and a character size.

When the character drawing process of the input glyph is completed, the image processing portion 350D stores temporarily the bitmap data of the glyph in the character cache memory portion 630. The image processing portion 350D utilizes the cache data as the output data in the drawing process of the same glyph.

The component cache memory portion 640 stores the bitmap data and the cache register information of respective component glyphs. In the present embodiment, the cache register information contains at least a font name, an identifier (ID) used to specify the glyph, and a character size.

When the input glyph corresponds to the composite glyph, the image processing portion 350D stores temporarily the bitmap data of the component glyphs in the component cache memory portion 640 as soon as the character drawing process of the component glyphs constituting the composite glyph is completed. The image processing portion 350D utilizes the cache data as the output data in the drawing process of the same component glyphs.

Character Drawing Command Executing Process: Third Embodiment

Figure 18:
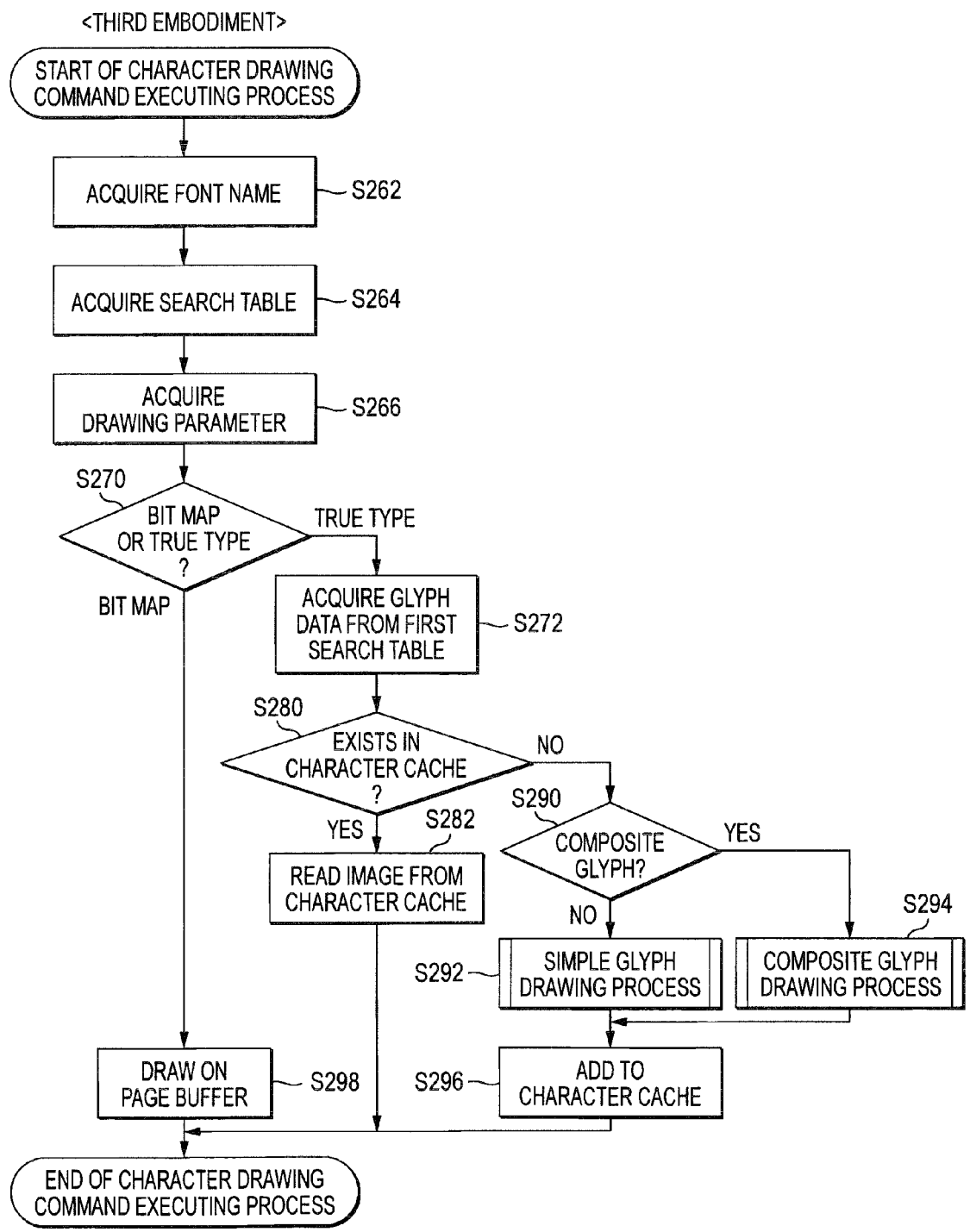
FIG. 18 is a flowchart explaining details of processing procedures in a character drawing command executing process of the third embodiment.

FIG. 18 is a flowchart explaining details of processing procedures in the character drawing command executing process (S260) of the third embodiment. Here, the step numbers similar to those in the first embodiment are affixed to process steps similar to those in the first embodiment.

In the character drawing command executing process (S260) of the third embodiment, the processes executed up to step S272 are similar to those in the first embodiment.

The search processing portion 466 acquires the glyph as the drawing object from the first search table TBL1 (S272), the character cache discriminating portion 610 decides whether or not the cache data of the glyph has already been registered in the character cache memory portion 630 (S280). If the cache data has already been registered (S280—YES), the image processing portion 350D reads the corresponding cache data from the character cache memory portion 630 (S282), and then draws the image in the predetermined layout position of the page buffer (S298).

If the cache data has not been registered (S280—NO), the image processing portion 350D decides whether or not the glyph is the composite glyph, like the first embodiment, and executes the drawing process in response to the result (S290 to S294). Then, the image processing portion 350D registers the image data of the produced character in the character cache memory portion 630 (S296), then draws the image in the predetermined layout position of the page buffer (S298), and then ends the character drawing command executing process.

Composite Glyph Character Drawing Process

Third Embodiment

Figure 19:
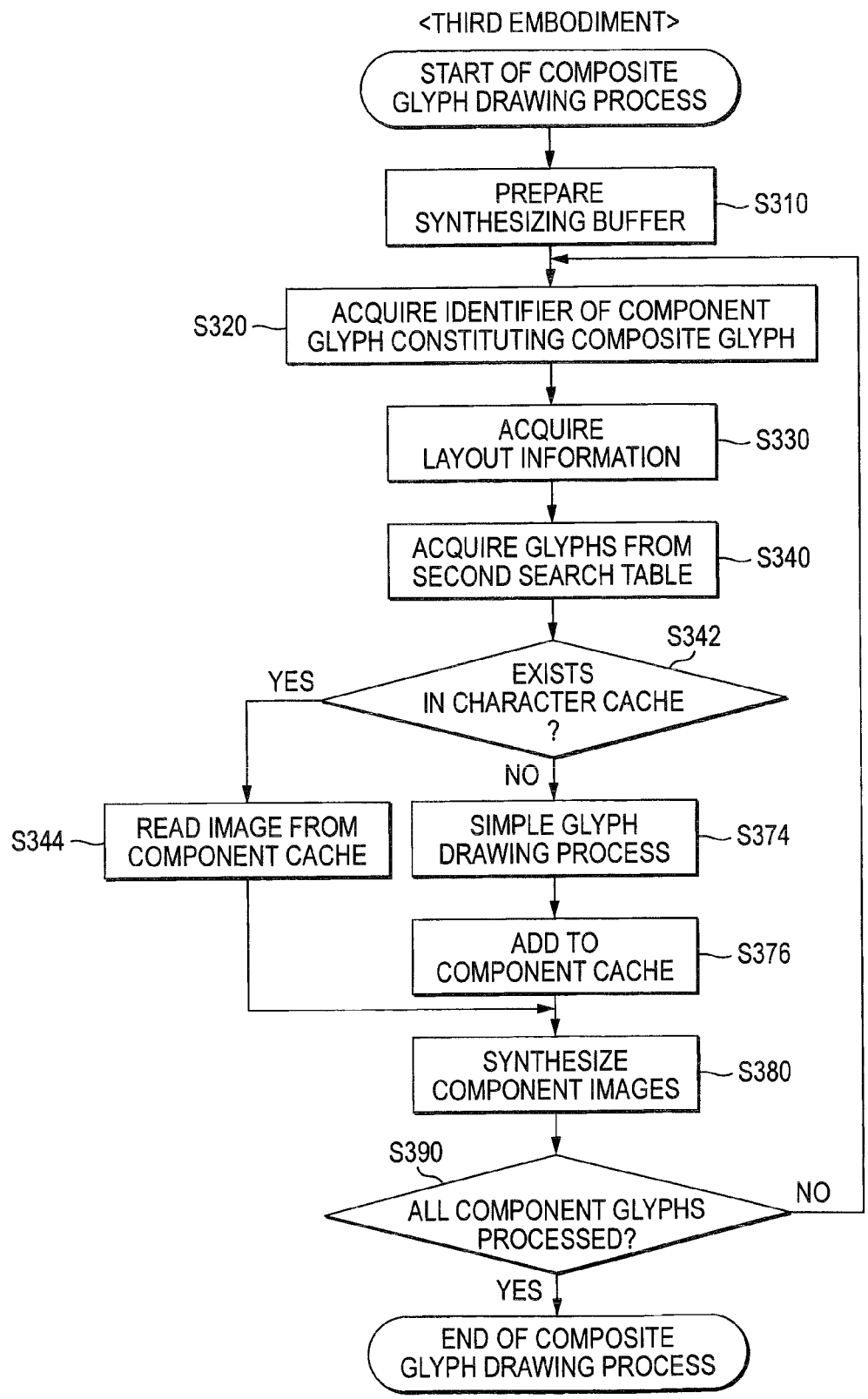
FIG. 19 is a flowchart explaining details of processing procedures in a composite glyph character drawing process of the third embodiment.

FIG. 19 is a flowchart explaining details of processing procedures in the composite glyph character drawing process (S294) of the third embodiment.

In the composite glyph character drawing process (S294) in the third embodiment, the processes executed up to step S340 are similar to those in the first embodiment.

The search processing portion 466 acquires the data of the component glyphs as the drawing object from the second search table TBL2, and transfers the data to the component cache discriminating portion 620 (S340). Here, "respective glyphs" are only the simple glyphs in the combination with the first embodiment, and are either the simple glyphs or the composite glyphs in the combination with the second embodiment.

The component cache discriminating portion 620 decides whether or not the cache data of respective component glyphs (the component images of respective glyphs) are registered in the component cache memory portion 640 (S342). If the cache registration (entry) exists (S342—YES), the image processing portion 350D read the corresponding cache data from the component cache memory portion 640 (S344), and then synthesizes the component images by drawing the component images of respective glyphs in respective corresponding positions of the synthesizing buffer (S380).

If no cache registration (entry) exists (S342—NO), the simple glyph drawing portion 482 produces the component images by executing the simple glyph drawing development (S374), and registers the produced component images in the component cache memory portion 640 (S376). The synthesizing portion 526 synthesizes the component images by drawing the component images of respective glyphs, which are drawing-developed by the simple glyph drawing portion 482, in respective corresponding positions of the synthesizing buffer (S380).

Application Example

Third Embodiment

FIG. 20A to FIG. 20C are views explaining application examples of the third embodiment. Here, FIG. 20A is a view showing the print data used in this application example. FIG. 20B is a view showing an example of registered information in the character cache memory portion 630 in this application example. FIG. 20C is a view showing an example of registered information in the component cache memory portion 640 in this application example. A structure of the composite glyph used in the print data shown in FIG. 20A is identical to that shown in FIG. 10B. In this case, examples of respective glyphs shown in the application examples are pseudo glyphs (pseudo code) used for the purpose of concrete explanation of the third embodiment, and it is discounted that they are similar to or different from the actual glyphs.

The print data shown in FIG. 20A is produced by the printer driver of the host side apparatus 2 shown in FIG. 1, and is received by the interface portion 330 of the printing machine 3 via the interface portion 230 and the transmission line 9.

In the printing machine 3, the image processing portion 350D acting as the drawing development processing portion executes the drawing development process every page in accordance with the processing procedures shown in FIG. 4.

Like the first embodiment, the image processing portion 350D executes such process sequentially up to all glyph definition commands contained in the print data (up to "Glyph 66257").

At this point of time, as shown in FIG. 10C(1), "Glyph 54596", "Glyph 65607", "Glyph 65650", "Glyph 65681", "Glyph 54736", "Glyph 66257" are registered in the first search table TBL1. Also, as shown in FIG. 10C(2), "Glyph 65607", "Glyph 65650", "Glyph 65681", "Glyph 66257" are registered in the second search table TBL2. Also, as shown in FIG. 20A(1), no already-registered character cache exists in the character cache memory portion 630 and, as shown in FIG. 20C(1), no already-registered component cache exists in the component cache memory portion 640.

Process of "Draw (100,100) 10 pt after <54596>"

The image processing portion 350D reads the next command "Draw (100,100) 10 pt <54596>" of the print data shown in FIG. 20A (S222: FIG. 4), and then goes to the command executing process shown in FIG. 5 (S230). Since this command corresponds to the command that draws "Glyph 54596" in a size of 10 pt in the position of the coordinated (100,100), the image processing portion 350D goes to the character drawing command executing process shown in FIG. 18 (S260) to process the "character drawing command".

The image processing portion 350D acquires the data of "Glyph 54596" by searching the first search table TBL1 (S272), and then acquires the drawing parameter (S274). Here, a font size of 10 pt is acquired.

Since the type of the command is true type font, the character cache discriminating portion 610 decides whether or not the cache data of the glyph has already been registered in the character cache memory portion 630 (S280). At this point of time, since the character cache is empty (S280—NO), the image processing portion 350D decides whether or not the glyph is the composite glyph (S290). Since "Glyph 54596" is the composite glyph (S290—YES), the image processing portion 350D executes the composite glyph character drawing process shown in FIG. 19 (S294).

When the goes to the composite glyph character drawing process (S294), the image processing portion 350D first prepares the synthesizing buffer (S310), and acquires sequentially the glyph IDs of respective glyphs constituting the composite glyph as the processing object and the layout information (S320, S330). Here, out of three simple glyphs "Glyph 65607", "Glyph 65650", and "Glyph 65681" constituting the composite glyph "Glyph 54596", for example, "ID: 65607" and the layout information are acquired at first. Such information can be obtained that "Glyph 65607" is arranged at the upper left of "Glyph 54596".

The image processing portion 350D acquires the data of "Glyph 65607" by searching the second search table TBL2 (S340). The component cache discriminating portion 620 decides whether or not the cache data of the component glyph has already been registered in the component cache memory portion 640 (S342). Since the component cache memory portion 640 is empty at this point of time (S342—NO), the simple glyph drawing portion 482 produces the component images by executing the drawing development of the simple glyph "Glyph 65607" (S374), and then registers the produced component images in the component cache memory portion 640 (S376). The synthesizing portion 526 pastes the component images of the simple glyph "Glyph 65607", which was drawing-developed by the simple glyph drawing portion 482, at the upper left of the synthesizing buffer (S380).

Here, the bitmap data of "Glyph 65607" is produced in a size of 10 pt. As shown in FIG. 20B(2), the bitmap data of "ID: 65607" and a size 10 pt at a time of production are added to the component cache memory portion 640.

The image processing portion 350D executes similarly the process of the remaining glyphs "Glyph 65650" and "Glyph 65681" constituting the composite glyph "Glyph 54596". Since the remaining glyphs are all simple glyphs and there is no cache registration in the component cache memory portion 640 (S342—NO), the image processing portion 350D searches them from the second search table TBL2, and then produces the synthesized image of the composite glyph "Glyph 54596" producing the component images respectively and also registers respective component images produced at this time in the component cache memory portion 640 (S374-S380). Here, the bitmap data of "Glyph 65650", "Glyph 65681" are produced in a size of 10 pt and, as shown in FIG. 20C(3), respective bitmap data of "ID: 65650", "ID: 65681" and a size of 10 pt at a time of production are added to the component cache memory portion 640.

The image processing portion 350D registers the synthesized image data (synthesized image) of the composite glyph "Glyph 54596", which was synthesized by the synthesizing buffer, in the character cache memory portion 630 (S296), then pastes the synthesized image data in the position of the coordinates (100, 100) of the page buffer (S298), and thus ends the character drawing registering command executing process. At this point of time, as shown in FIG. 20B(2), the bitmap data of the composite glyph "Glyph 54596" and a size of 10 pt at a time of production are added to the character cache memory portion 630.

Process of "Draw (100, 120) 10 pt <54736>"

The image processing portion 350D reads the next command "Draw (100,120) 10 pt <54736>" (S222; FIG. 4), and goes to the command executing process shown in FIG. 5 (S230). Since this command corresponds to the command that draws "Glyph 54736" in a size of 10 pt in the position of the coordinates (100, 120), the image processing portion 350D goes to the character drawing command executing process shown in FIG. 18 (S260) to process the "character drawing command".

The image processing portion 350D acquires the data of "Glyph 54736" by searching the first search table TBL1 (S272), and acquires the drawing parameter (S274). Here, a font size of 10 pt is acquired.

Since the type of the command is true type font, the character cache discriminating portion 610 decides whether or not the cache data of the glyph has already been registered in the character cache memory portion 630 (S280). At this point of time, as shown in FIG. 20B(2) since there is no entry corresponding to "ID: 54736" and a size of 10 pt (S280—NO), the image processing portion 350D decides whether or not the glyph is the composite glyph (S290). Since "Glyph 54736" is the composite glyph (S290—YES), the image processing portion 350D executes the composite glyph character drawing process shown in FIG. 19 (S294).

When the process goes to the composite glyph character drawing process (S294), the image processing portion 350D first prepares the synthesizing buffer corresponding to a size of 10 pt (S310), and acquires sequentially the glyph IDs of respective glyphs constituting the composite glyph as the processing object and the layout information (S320, S330). Here, out of two simple glyphs "Glyph 66257", "Glyph 65681" constituting the composite glyph "Glyph 54736", for example, "ID: 66257" and the layout information are acquired first. Such information can be obtained that "Glyph 66257" is arranged at the upper left of "Glyph 54736".

The image processing portion 350D acquires the data of the simple glyph "Glyph 66257" by searching the second search table TBL2 (S340, S350—YES). The component cache discriminating portion 620 decides whether or not the cache data of the component glyph has already been registered in the component cache memory portion 640 (S342). As shown in FIG. 20B(3), since no entry corresponding to "ID: 66257" and a size 10 pt exists in the component cache memory portion 640 (S342—NO), the simple glyph drawing portion 482 produces the component image by executing the drawing development of the simple glyph "Glyph 66257" (S374), and then registers the produced component image in the component cache memory portion 640 (S376). The synthesizing portion 526 pastes the component image of the simple glyph "Glyph 66257", which the simple glyph drawing portion 482 drawing-develops, at the upper left of the synthesizing buffer (S380).

Here, the bitmap data of "Glyph 66257" is produced in a size of 10 pt. As shown in FIG. 20B(4), the bitmap data of "ID: 66257" and a size 10 pt at a time of production are added to the component cache memory portion 640.

The image processing portion 350D executes similarly the process of the remaining simple glyph "Glyph 65681" constituting the composite glyph "Glyph 54736". The image processing portion 350D acquires the glyph ID of the simple glyph "Glyph 65681" and the layout information (S320, S330). Here, "ID: 65681" and the layout information are acquired at first. Such information can be obtained that "Glyph 65681" is arranged at the lower right of "Glyph 54736".

The image processing portion 350D acquires the data of the simple glyph "Glyph 65681" by searching the second search table TBL2 (S340). The component cache discriminating portion 620 decides whether or not the cache data of the component glyph has already been registered in the component cache memory portion 640 (S342). As shown in FIG. 20C(4), since the component cache memory portion 640 has an entry of "ID: 65681" and a size 10 pt at this point of time (S342—YES), the image processing portion 350D reads "ID: 65681" and the bitmap data of a size 10 pt from the component cache memory portion 640 (S344), and synthesizes the component image by pasting at the lower right of the synthesizing buffer (S380).

The image processing portion 350D registers the synthesized image data (synthesized image) of the composite glyph "Glyph 54736", which is synthesized by the synthesizing buffer, in the character cache memory portion 630 (S296), then pastes the synthesized image in the position of the coordinates (100, 120) of the page buffer (S298), and then ends the character drawing command executing process. As shown in FIG. 20B(3), at this point of time, the bitmap data of the composite glyph "Glyph 54736" and a size 10 pt at a time of production are added to the character cache memory portion 630.

Process of "Draw (100, 140) 10 pt <54596>"

The image processing portion 350D reads the next command "Draw (100, 140) 10 pt <54596>" of the print data shown in FIG. 20A (S222: FIG. 4), and then goes to the command executing process shown in FIG. 5 (S230). Since this command corresponds to the command that draws "Glyph 54596" in a size of 10pt in the position of the coordinates (100, 140), the image processing portion 350D goes to the character drawing command executing process (S260) shown in FIG. 18 to process the "character drawing command".

The image processing portion 350D acquires the data of "Glyph 54596" by searching the first search table TBL1 (S272), and then acquires the drawing parameter (S274). Mere, a font size of 10 pt is acquired.

Since the type of the character is the true type font, the character cache discriminating portion 610 decides whether or not the cache data of the glyph has already been registered in the character cache memory portion 630 (S280). As shown in FIG. 20B(3), since there is an entry corresponding to "ID: 54596" and a size of 10 pt at this point of time (S280—YES), the image processing portion 350D reads "ID: 54596" and the bitmap data in a size of 10 pt from the character cache memory portion 630 (S344), then pastes the data on the coordinates (100, 140) of the page buffer (S298), and then ends the character drawing command executing process.

Process of "Draw (120, 100) 12 pt <54596>"

The image processing portion 350D reads the next command "Draw (120,100) 12 pt <54596>" of the print data shown in FIG. 20A (S222; FIG. 4), and then goes to the command executing process shown in FIG. 5 (S230). Since this command corresponds to the command that draws "Glyph 54596" in a size of 12 pt in the position of the coordinates (120, 100), the image processing portion 350D goes to the character drawing command executing process (S260) shown in FIG. 18 to process the "character drawing command".

The image processing portion 350D acquires the data of "Glyph 54596" by searching the first search table TBL1 (S272), and then acquires the drawing parameter (S274). Here, a font size of 12 pt is acquired.

Since the type of the character is the true type font, the character cache discriminating portion 610 decides whether or not the cache data of the glyph has already been registered in the character cache memory portion 630 (S280). As shown in FIG. 20B(3), since there is no entry corresponding to "ID: 54596" and a size of 12 pt at this point of time (S280—NO), the image processing portion 350D decides whether or not the glyph is the composite glyph (S290). Since "Glyph 54596" is the composite glyph (S290—YES), the image processing portion 350D executes the character drawing process of the composite glyph as shown in FIG. 19 (S294).

When the process goes to the composite glyph character drawing process (S294), the image processing portion 350D first prepares the synthesizing buffer corresponding to a size of 12 pt (S310), and then acquires sequentially the glyph IDs of respective glyphs constituting the composite glyph as the processing object and the layout information (S320, S330). Here, out of three simple glyphs "Glyph 65607", "Glyph 65650", "Glyph 65681" constituting the composite glyph "Glyph 54596", for example, "ID: 65607" and the layout information are acquired at first. Such information can be obtained that "Glyph 65607" is arranged at the upper left of "Glyph 54596".

The image processing portion 350D acquires the data of the simple glyph "Glyph 65607" by searching the second search table TBL2 (S340). The component cache discriminating portion 620 decides whether or not the cache data of the component glyph has already been registered in the component cache memory portion 640 (S342). At this point of time, since there is no entry corresponding to "ID: 65607" and a size of 12 pt (S342—NO), the simple glyph drawing portion 482 produces the component images by executing the drawing development of the simple glyph "Glyph 65607" (S374), and then registers the produced component images in the component cache memory portion 640 (S376). The synthesizing portion 526 pastes the component images of the simple glyph "Glyph 65607", which is drawing-developed by the simple glyph drawing portion 482, at the upper left of the synthesizing buffer (S380).

Here, the bitmap data of "Glyph 65607" is produced in a size of 12 pt. As shown in FIG. 20C(5), the bitmap data of "ID: 65607" and a size 12 pt at a time of production are added to the component cache memory portion 640.

The image processing portion 350D executes similarly the process of the remaining glyphs "Glyph 65650", "Glyph 65681" constituting the composite glyph "Glyph 54596". Since these remaining glyphs are all the simple glyphs and there is no cache registration of 12 pt in the component cache memory portion 640 (S342—NO), the image processing portion 350D produces the component images respectively by searching the second search table TBL2 and produces the synthesized images of the composite glyph "Glyph 54596", and registers respective component images produced at this time in the component cache memory portion 640 (S374-S380). Here, the bitmap data of "Glyph 65650", "Glyph 65681" in a size of 12 pt are produced and, as shown in FIG. 20C(6), the bitmap data of "ID: 65650", "ID: 65681" and a size 12 pt at a time of production are added to the component cache memory portion 640.

The image processing portion 350D registers the synthesized image data (synthesized image) of the composite glyph "Glyph 54596", which is synthesized by the synthesizing buffer, in the character cache memory portion 630 (S296), then pastes the synthesized image in the position of the coordinates (120, 100) of the page buffer (S298), and then ends the character drawing command executing process. At this point of time, as shown in FIG. 20B(4), the bitmap data of the composite glyph "Glyph 54596" and a size 12 pt at a time of production are added to the character cache memory portion 630.

With the above, the character drawing process based upon the print data shown in FIG. 20A is completed.

In the application example of the third embodiment, the character drawing process using the cache searching is combined with the character drawing process using the glyph searching shown in the first embodiment. Therefore, the high-speed process of the character drawing using the cache searching is operated when there is the cache registration, while the high-speed process of the character drawing using the glyph searching in the first embodiment is operated when there is no cache registration. When the cache registration of the character is not found, the character drawing process is delayed in the cache searching that is not combined with the first embodiment, like the case where no cache function is equipped. In this case, in the third embodiment, a reduction in process speed is suppressed because the glyph searching in the first embodiment is operated.

<Configuration by Electronic Computer>

Figure 21:
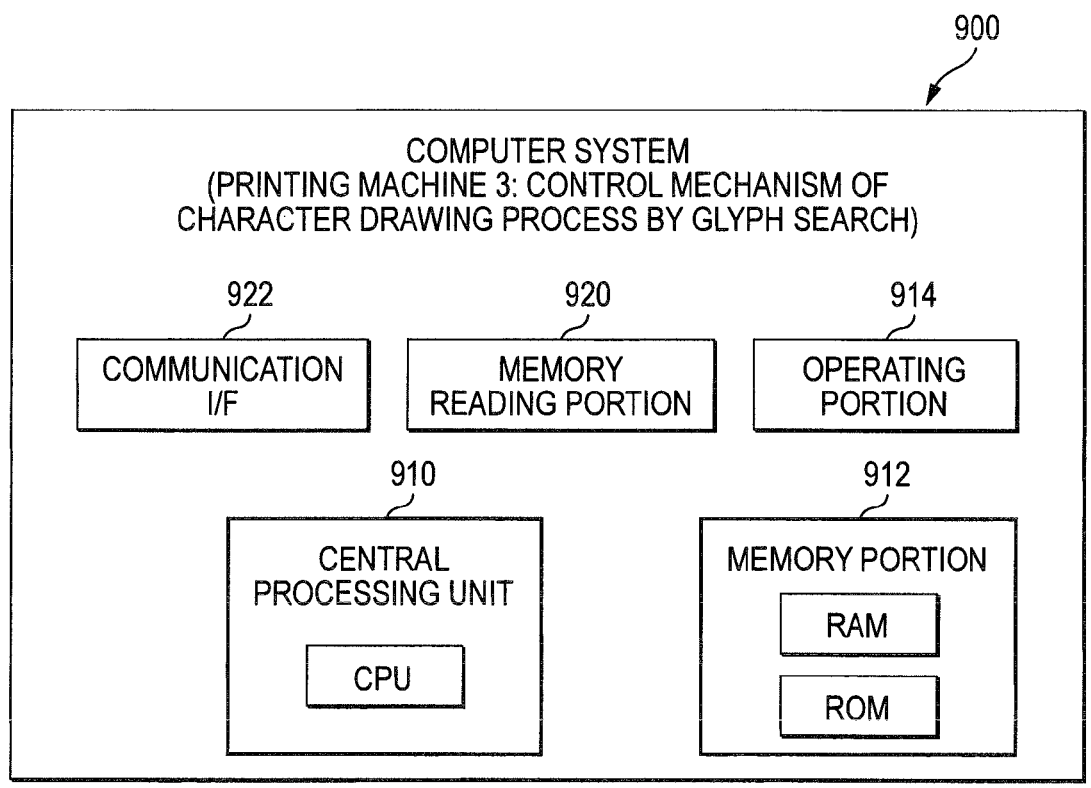
FIG. 21 is a block diagram showing an exemplary embodiment when a controlling mechanism in the character drawing process by the glyph search is constructed by utilizing an electronic computer.

FIG. 21 is a block diagram showing another example of a controlling mechanism of the character drawing process using the glyph searching. Here, a more practical hardware configuration of the controlling mechanism of the character drawing process using the glyph search of the printing machine 3, which is constructed by a microprocessor, or the like that runs a software by utilizing an electronic computer such as a personal computer, or the like, is shown.

More particularly, in the present embodiment, the setup of the control mechanism in the printing machine 3 that executes the controlling process with respect to the character drawing process using the glyph search is not limited to that is constructed using hardware processing circuits, and such setup can be implemented by software using the electronic computer (computer) based on the program codes that realize such function. Therefore, a program that is suitable to build up the setup according to the present embodiment by software using the electronic computer (computer) or a computer-readable memory medium that stores this program can be extracted as the invention. When the setup that is executed by the software is employed, the processing procedures, etc. can be varied easily without any change of the hardware.

The character drawing process using a series of glyph searches mentioned above can be implemented not only by a sole hardware or software but also by a composite configuration of both wares. When the process implemented by the software is executed, either the program indicating the process procedures may be installed into the memory medium in the computer fitted into the hardware and be executed or the program may be installed into the general-purpose computer, which can execute various processes, and be executed.

The program that causes the computer to execute the character drawing process function by using the glyph search is distributed through the recording medium such as CD-ROM, or the like. Also, this program may be stored in not the CD-ROM but the FD. Also, the MO drive may be provided, and the program may be stored in the MO. Also, the program may be stored in other recording medium such as the non-volatile semiconductor memory card such as the flash memory card, or the like. Further, the program constituting the software may be provided via the recording medium, or may be provided via the wired or wireless communication network. For example, the program may be downloaded from other server, or the like via the network such as the Internet, or the like, and acquired or updated newly. Also, the program can be provided as the file that describes the program codes that implement the function to execute the character drawing process using the glyph search. In this case, the program may be provided not only as the general program file but also as individual program modules, in response to the hardware configuration of the system that is constructed by the computer.

For example, a computer system 900 includes a central controlling unit 910, a memory portion 912, an operating portion 914, and other peripheral devices (not shown).

The central controlling unit 910 is constructed by the CPU (Central Processing Unit), the microprocessor, or the like. This central controlling unit 910 is similar to the central unit of the electronic computer, whose typical example is the CPU in which operations and controlling functions performed by the computer are integrated into an ultra-compact integrated circuit.

The memory portion 912 has a ROM (Read Only Memory) as a memory portion used to read only, a RAM (Random Access Memory) used to read/write at random, and the like. A control program for the character drawing processing function using the glyph search, etc. are stored in the ROM. The operating portion 914 is the user interface to accept the user's operation.

As the control system of the computer system 900, the external recording medium (not shown) such as the memory card, or the like may be detachably attached or the communication network such as the Internet, or the like may be connected. For this purpose, the control system may have a memory reading portion 920 for reading the information of the portable recording medium and a communication I/F 922 as a communication interface means to the external device, in addition to the central controlling unit 910 and the memory portion 912. The provision of the memory reading portion 920 responds to the install or the update of the program from the external recording medium. The provision of the communication I/F 922 responds to the install or the update of the program through the communication network. The basic setup of the character drawing process using the glyph search is similar to the above embodiment.

Herein, an example in which the control mechanism of the printing machine 3 is implemented on software by the computer is explained. As the concrete means of respective portions (containing the function blocks) of the control mechanism of the printing machine 3 used to implement the character drawing process using the glyph search in the present embodiment, hardware, software, communication means, their combination, and other means can be employed. Such approach itself is obvious for those skilled in the art. Also, the functional blocks may be combined and integrated into one functional block. Also, the software used to cause the computer to execute the programmed process is installed in a distributed manner in response to the combination mode.

As explained above, the present invention is explained by using the embodiments. But a technical scope of the present invention is not limited to the scope set forth in the above embodiments. Various variations and improvements can be applied to the above embodiments without departing from a gist of the invention. Also, such modes to which variations and improvements are applied are contained in the technical scope of the present invention.

Also, the above embodiments should not be interpreted to limit the invention according to claims (scope of demand for patent), and all combinations of features explained in the embodiments are not always essential to the means for solving the problems in the invention. The inventions in various stages are contained in the above embodiments, and various inventions can be extracted by using appropriate combinations in a plurality of disclosed constituent elements. Even when several constituent elements are deleted from all constituent elements shown in the embodiments, the configuration from which several constituent elements are deleted can be extracted as the invention, as far as predetermined advantages can be achieved.

For example, in the third embodiment in which the character drawing by using the cache search is also employed, the cache search is applied to both the character and the component character by using both the character cache memory portion 630 and the component cache memory portion 640. In this case, the cache search is applied to any one of the character and the component character only.

What is claimed is:

1. A drawing processing apparatus, comprising:
a plurality of character definition information memories each storing definition information on a character shape;
a registering portion that, when a drawing command containing the definition information on the character shape is received, determines one of the plurality of character definition information memories for each character contained in the drawing command, depending on whether the definition information on the character shape is simple definition information that defines the character shape itself of the character or is a combinational definition information that defines a combination of simple or combinational definition information defining components of the character; and
a drawing process instructing portion that instructs to read, from the plurality of character definition information memories, the definition information on the character shape corresponding to the character to be processed, to execute a drawing process of the each character contained in the drawing command, wherein
the plurality of character definition information memories includes a first character definition information memory and a second character definition information memory; and
the registering portion registers all the definition information on the character shape in the first character definition information memory, regardless of whether the definition information on the character shape is the simple definition information or the combinational definition information, and registers the simple definition information in the second character definition information memory.

2. The drawing processing apparatus according to claim 1, wherein
when the definition information on the character shape corresponding to the character to be processed is read from the first character definition information memory and the read definition information is the simple definition information, the drawing process instructing portion instructs to execute the drawing process of the character based on the read simple definition information, and
when the definition information on the character shape corresponding to the character to be processed is read from the first character definition information memory and the read definition information is the combinational definition information, the drawing process instruction portion instructs to read the simple definition information specified by the read combinational definition information from the second character definition information memory to execute the drawing process of the character.

3. The drawing processing apparatus according to claim 2, wherein, when the drawing process instructing portion is unable to read the simple definition information specified by the read combinational definition information from the second character definition information memory, the drawing process instructing portion instructs to read the simple definition information from the first character definition information memory to execute the drawing process of the character.

4. The drawing processing apparatus according to claim 3, wherein, after the drawing process based on the simple definition information read from the first character definition information memory and specified by the combinational definition information is completed, the registering portion registers the read simple definition information in the second character definition information memory.

5. The drawing processing apparatus according to claim 1, wherein the registering portion registers all the definition information on the character shape in the first character definition information memory, regardless of whether the definition information on the character shape is the simple definition information or the combinational definition information, and
the registering portion registers definition information which has a smaller occupied rate in a font of the character out of the simple definition information and the combinational definition information, in the second character definition information memory.

6. The drawing processing apparatus according to claim 5, wherein, when the drawing process instructing portion is unable to read the simple definition information specified by the combinational definition information from one of the first and second character definition information memories, the drawing process instructing portion instructs to read the simple definition information from the other of the first and second character definition information memories to execute the drawing process of the character.

7. The drawing processing apparatus according to claim 6, wherein, after the character drawing process based on the simple definition information read from the other of the first and second character definition information memories and specified by the combinational definition information is completed, the registering portion registers the read simple definition information in the one of the first and second character definition information memories.

8. The drawing processing apparatus according to claim 1, further comprising:
a character image memory that stores a character shape image of the character specified by the simple definition information;
wherein when the character shape image of the character to be processed is stored in the character image memory, the drawing process instructing portion instructs to read the character shape image to execute the drawing process of the character, and when the character shape image of the character to be processed is not stored in the character image memory, the drawing process instructing portion instructs to read the definition information on the character shape from the plurality of character definition information memories to execute the drawing process of the character.

9. The drawing processing apparatus according to claim 8, wherein, after the drawing process based on the definition information on the character shape read from the plurality of character definition information memories is completed, the registering portion registers the character shape image of the drawn character on the character image memory.

10. The drawing processing apparatus according to claim 1, further comprising:

a component image memory that stores a character shape image of a component character constituting the character, the component character being specified by the combinational definition information;

wherein when the character shape image of the component character is stored in the component image memory, the drawing process instructing portion instructs to read the character shape image of the component character from the component image memory to execute the drawing process of the component character, and when the character shape image of the component character is not stored in the component image memory, the drawing process instructing portion instructs to read the combinational definition information from the plurality of character definition information memories to execute the drawing process of the component character.

11. The drawing processing apparatus according to claim 10, wherein, after the drawing process of the component character based on the combinational definition information read from the plurality of character definition information memories is completed, the registering portion registers the character shape image of the drawn component character in the component image memory.

12. An image outputting apparatus, comprising:

a plurality of character definition information memories each storing definition information on a character shape;

a registering portion that, when a drawing command containing the definition information on the character shape is received, determines one of the plurality of character definition information memories for each character contained in the drawing command, depending on whether the definition information on the character shape is simple definition information that defines the character shape itself of the character or is a combinational definition information that defines a combination of simple definition information defining components of the character;

a drawing process instructing portion that instructs to read, from the plurality of character definition information memories, the definition information on the character shape corresponding to the character to be processed, to execute a drawing process of the each character contained in the drawing command; and an image outputting portion that outputs an image based on the drawn character to an output medium, wherein the plurality of character definition information memories includes a first character definition information memory and a second character definition information memory; and the registering portion registers all the definition information on the character shape in the first character definition information memory, regardless of whether the definition information on the character shape is the simple definition information or the combinational definition information, and registers the simple definition information in the second character definition information memory.

13. The image outputting apparatus according to claim 12, wherein the registering portion registers the simple definition information and the combinational definition information in different character definition information memories.

14. A method for drawing processing, comprising:

receiving a drawing command containing definition information on a character shape;

determining one of a plurality of character definition information memories for each character contained in the drawing command, depending on whether the definition information on the character shape is simple definition information that defines the character shape itself of the character or is a combinational definition information that defines a combination of simple definition information defining components of the character, the plurality of character definition information memories includes a first character definition information memory and a second character definition information memory;

registering all the definition information on the character shape in the first character definition information memory, regardless of whether the definition information on the character shape is the simple definition information or the combinational definition information, and registers the simple definition information in the second character definition information memory; and instructing to read, from the plurality of character definition information memories, the definition information on the character shape corresponding to the character to be processed, to execute a drawing process of the each character contained in the drawing command.

15. A non-transitory computer readable medium storing a program causing a computer to execute a drawing process, the drawing process comprising:

receiving a drawing command containing definition information on a character shape;

determining one of a plurality of character definition information memories for each character contained in the drawing command, depending on whether the definition information on the character shape is simple definition information that defines the character shape itself of the character or is a combinational definition information that defines a combination of simple definition information defining components of the character, the plurality of character definition information memories includes a first character definition information memory and a second character definition information memory;

registering all the definition information on the character shape in the first character definition information memory, regardless of whether the definition information on the character shape is the simple definition information or the combinational definition information, and registers the simple definition information in the second character definition information memory; and instructing to read, from the plurality of character definition information memories, the definition information on the character shape corresponding to the character to be processed, to execute a drawing process of the each character contained in the drawing command.

* * * * *